United States Patent
Shirasawa

(10) Patent No.: US 7,310,167 B2
(45) Date of Patent: Dec. 18, 2007

(54) COLOR CONVERTING DEVICE EMPHASIZING A CONTRAST OF OUTPUT COLOR DATA CORRESPONDING TO A BLACK CHARACTER

(75) Inventor: Hisao Shirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/433,528

(22) Filed: May 15, 2006

(65) Prior Publication Data
US 2006/0203270 A1 Sep. 14, 2006

Related U.S. Application Data

(62) Division of application No. 10/067,417, filed on Feb. 7, 2002, now Pat. No. 7,072,084.

(30) Foreign Application Priority Data

Feb. 8, 2001 (JP) ............................. 2001-031864
Aug. 23, 2001 (JP) ............................. 2001-252950

(51) Int. Cl.
*H04N 1/60* (2006.01)
*H04N 1/46* (2006.01)
*G03F 3/08* (2006.01)
*G06K 9/00* (2006.01)

(52) U.S. Cl. .................. 358/1.9; 358/525; 358/518; 358/520; 358/529; 358/523; 382/162; 382/167; 382/266; 382/164; 382/176; 382/166; 382/239

(58) Field of Classification Search ............... 358/525, 358/1.9, 527, 518, 520, 529, 2.1, 523, 532, 358/462, 539; 382/162, 167, 266, 164, 194, 382/176, 166, 239

See application file for complete search history.

(56) References Cited

U.S. PATENT DOCUMENTS

| | | | |
|---|---|---|---|
| 5,331,442 A * | 7/1994 | Sorimachi | ................. 358/532 |
| 5,689,590 A | 11/1997 | Shirasawa et al. | |
| 5,696,842 A | 12/1997 | Shirasawa et al. | |
| 5,717,507 A | 2/1998 | Vondran, Jr. | |
| 5,909,505 A * | 6/1999 | Katayama et al. | ......... 382/164 |

(Continued)

FOREIGN PATENT DOCUMENTS

JP 57-208765 12/1982

(Continued)

OTHER PUBLICATIONS

U.S. Appl. No. 08/052,918, filed Apr. 27, 1993, Unknown.

(Continued)

*Primary Examiner*—Kimberly Williams
*Assistant Examiner*—Charlotte M. Baker
(74) *Attorney, Agent, or Firm*—Oblon, Spivak, McClelland, Maier & Neustadt, P.C.

(57) ABSTRACT

A color converting device converts input CMYK data into output color data in a predetermined different format. The color converting device comprises a contrast emphasizing unit emphasizing a contrast of the output color data corresponding to the CMYK data representing a black-character color more than a contrast of the output color data corresponding to the CMYK data representing a non-black-character color.

25 Claims, 23 Drawing Sheets

U.S. PATENT DOCUMENTS

| | | | |
|---|---|---|---|
| 5,966,474 | A | 10/1999 | Vondran, Jr. |
| 6,137,595 | A | 10/2000 | Sakuyama et al. |
| 6,226,011 | B1 | 5/2001 | Sakuyama et al. |
| 6,587,223 | B1 | 7/2003 | Yamaguchi |
| 6,839,460 | B2 | 1/2005 | Shirasawa |
| 6,891,649 | B1 * | 5/2005 | Kondo ................. 358/527 |
| 6,954,286 | B1 * | 10/2005 | Muramoto ............. 358/1.9 |
| 2002/0051209 | A1 * | 5/2002 | Yamada ................. 358/2.1 |
| 2003/0118231 | A1 * | 6/2003 | Uchida et al. .......... 382/164 |
| 2003/0142865 | A1 * | 7/2003 | Hirota et al. ........... 382/167 |

FOREIGN PATENT DOCUMENTS

| | | |
|---|---|---|
| JP | 6-141172 | 5/1994 |
| JP | 8-212324 | 8/1996 |
| JP | 10-191078 | 7/1998 |
| JP | 11-12819 | 4/1999 |
| JP | 11-112819 | 4/1999 |
| JP | 2000-134491 | 5/2000 |

OTHER PUBLICATIONS

U.S. Appl. No. 09/431,999, filed Nov. 2, 1999, Unknown.
U.S. Appl. No. 11/433,528, filed May 15, 2006, Shirasawa.

* cited by examiner

| EXPRESSION | 8-VERTEX SOLID |
|---|---|
| (ΔC>=ΔM)&(ΔM>=ΔY) | T1 |
| (ΔC>=ΔY)&(ΔM<ΔY) | T2 |
| (ΔC>=ΔM)&(ΔC<ΔY) | T3 |
| (ΔC<ΔM)&(ΔM<ΔY) | T4 |
| (ΔC<ΔY)&(ΔM>=ΔY) | T5 |
| (ΔC<ΔM)&(ΔC>=ΔY) | T6 |

| 8-VERTEX SOLID | COEFFICIENT α | COEFFICIENT β | COEFFICIENT γ | COEFFICIENT δ |
|---|---|---|---|---|
| T1 | P(1,9)-P(0,8) | P(3,11)-P(1,9) | P(7,15)-P(3,11) | P(0,8) |
| T2 | P(1,9)-P(0,8) | P(3,11)-P(1,9) | P(5,13)-P(1,9) | P(0,8) |
| T3 | P(5,13)-P(4,12) | P(7,15)-P(5,13) | P(4,12)-P(0,8) | P(0,8) |
| T4 | P(7,15)-P(6,14) | P(6,14)-P(4,12) | P(4,12)-P(0,8) | P(0,8) |
| T5 | P(7,15)-P(6,14) | P(2,10)-P(0,8) | P(6,14)-P(2,10) | P(0,8) |
| T6 | P(3,11)-P(2,10) | P(2,10)-P(0,8) | P(7,15)-P(3,11) | P(0,8) |

COLOR CONVERTING DEVICE EMPHASIZING A CONTRAST OF OUTPUT COLOR DATA CORRESPONDING TO A BLACK CHARACTER

BACKGROUND OF THE INVENTION

1. Field of the Invention

The present invention generally relates to a color conversion technology of CMYK data, and more particularly, to a color converting device, a color converting method, and a recording medium storing color printer software operated in a workstation, for converting CMYK print data (a color image signal) generated in an image forming device, such as a color copying machine, a color printer, or a color facsimile, into color data (a color signal) in a different format suitable for displaying on a color display or printing from another color printer.

2. Description of the Related Art

There are a lot of conventional technologies regarding a color conversion of CMYK data.

For example, a memory map interpolative calculation method using a four-dimensional lookup table is one of general color converting methods for converting color data (CMYK image data) consisting of four color components such as CMYK into RGB image data. (e.g., Japanese Patent No. 2,903,808 and Japanese Laid-Open Patent Application No. 57-208765)

The above-mentioned memory map interpolative calculation method realizes a highly precise color conversion throughout a color space. The method comprises the steps of dividing a four-dimensional color space formed by four color signals into a plurality of five-vertex solids, selecting a five-vertex solid including an input color by using higher-order bits of input data (an input signal), and reading an interpolative calculation intensity corresponding to the selected five-vertex solid from a four-dimensional lookup table so as to perform a linear interpolative calculation.

Other means for converting CMYK image data into RGB image data include a device described in Japanese Laid-Open Patent Application No. 9-284579. This device performs a four-dimensional interpolative calculation by linearly interpolating results of a plurality of three-dimensional interpolative calculations. For example, the four-dimensional interpolative calculation can be performed to input CMYK signals by performing a plurality of three-dimensional interpolative calculations of a C-M-Y space, selecting two of results of the three-dimensional interpolative calculations according to higher-order bits of a K signal, and linearly interpolating the selected two results by lower-order bits of the K signal.

However, the above-mentioned memory map interpolative calculation method, which divides a cubic unit into 24 five-vertex solids, requires judging processes in 24 patterns using lower-order bits of the input signal. Although these judging processes can be processed in parallel when performed by means of hardware, these judging processes claim a long time to successively compare the lower-order bits with each other to find a larger bit in each (magnitude relation) comparison when performed by means of software (in a CPU).

As to the above-mentioned device described in Japanese Laid-Open Patent Application No. 9-284579, since the device performs a plurality of the three-dimensional interpolative calculations in parallel, the three-dimensional interpolative calculations claim quite a long time when processed by a CPU. For instance, performing a four-dimensional interpolative calculation in which each of axes C, M, Y and K is divided into 8 entails a total of nine three-dimensional interpolative calculations corresponding to K signals in nine patterns.

Also, there is a method for printing CMYK print data by another color printer. This method comprises the steps of converting CMYK data into a device-independent Lab signal, correcting the Lab signal so as to faithfully reproduce a ground color, performing a contrast control for enhancing a visibility of a highlight when not reproducing the ground color, and thereafter converting the Lab signal into CMYK data used for another color printer. (Japanese Laid-Open Patent Application No. 8-212324)

It is well known that a hardcopy image printed on such a printer as a color printer and a softcopy image displayed on such a display as a CRT display are perceived as differently looking colors because of utterly different color reproducing methods applied to the images, though the images are based on same image data. Thereupon, there is a method for making the hardcopy image and the softcopy image perceived as identically looking colors. This method comprises the steps of equalizing a dynamic range of input color data and a dynamic range of output color data, creating a color conversion profile by using a chromatic adaptation model so that the hardcopy image and the softcopy image become perceptually identical, and performing a color conversion by using the color conversion profile. (Japanese Laid-Open Patent Application No. 11-112819)

Some of image forming devices such as color printers and color copying machines can generate CMYK data in the devices themselves and store the CMYK data in an inner storage device such as a hard disk so as to use the CMYK data repeatedly. This stored CMYK data can be converted into RGB data more reusable in a computer so as to be displayed as a softcopy image on a display connected to the computer. Furthermore, this RGB data displayed on the display can be processed as by adding characters or symbols thereto, and this processed digital image data can be reproduced again as a hardcopy.

However, simply converting the stored CMYK data into the RGB data and transmitting the RGB data to the computer so as to display the RGB data on the display or print the RGB data on another color printer may not possibly result in a high-quality image. Especially the reproduction quality of a black character is noticeably deteriorated.

This is because the CMYK data generated in the image forming device has a characteristic optimized for a hardcopy. For example, when a color copying machine prints a black character by overlapping four colors of CMYK, displacement of each color reduces the sharpness and legibility of the black character. Thereupon, the color copying machine often performs an image area separation process which extracts edge parts of a black character so as to print the edge parts monochromatically with the color of K, and separates the color of other pictorial parts into the four colors of CMYK so as to use inks of all the four colors. Likewise, a color printer performs an object-suited chromatic process which judges a draw code in a printer driver so as to print a black character monochromatically with the color of K, and separate the color of other parts into the four colors. However, simply converting such CMYK data including a black character part and other parts undergoing different color reproduction methods into RGB data, etc. cannot gain a high-quality black character reproduction in displaying on a display or printing from another color printer.

Additionally, the above-mentioned technology disclosed in Japanese Laid-Open Patent Application No. 8-212324 basically enables a faithful color reproduction by converting CMYK data into colorimetrically equal CMYK data, because the technology is aimed at a conversion between hardcopy output signals. However, in a case where the CMYK data is converted into RGB data used for displaying and then is output to a color printer via a printer driver, the printer driver often performs a color correction equalizing a dynamic range of a monitor to a dynamic range of a color printer output. Accordingly, simply equalizing reference whites of CMYK data and RGB data results in an insufficient density of black in the printer output.

On the other hand, since the above-mentioned technology disclosed in Japanese Laid-Open Patent Application No. 11-112819 equalizes a dynamic range of input color data and a dynamic range of output color data, this technology can convert the input color data into the output color data suitable for a screen display, and also can prevent the above-mentioned decrease in black density when outputting the color data to another color printer via a printer driver. However, since this conventional technology is aimed at input color data read from a hard copy by a scanner or input by a digital camera, the technology cannot be applied to CMYK data subjected to the above-described image area separation process or the above-mentioned object-suited chromatic process because of problems such as that the technology cannot determine a black point (a darkest point) of the CMYK data.

SUMMARY OF THE INVENTION

It is a general object of the present invention to provide a color converting device and method, and a color conversion profile creating device and method, in which the above-mentioned problems are eliminated.

A more specific object of the present invention is to provide a color converting device converting CMYK print data generated in an image forming device, such as a color printer, a color copying machine, or a color facsimile, into RGB data or the like which enables a high-quality black character reproduction in displaying on a display or printing from another color printer, to provide a method and a device of creating a color conversion profile used in the color converting device, and to provide a color converting device and method capable of performing at high speed an interpolative calculation for n-dimensional data (n>=4) preferable in a software processing.

In order to achieve the above-mentioned objects, there is provided according to one aspect of the present invention a color converting device converting input CMYK data into output color data in a predetermined different format, the device comprising:

a contrast emphasizing unit emphasizing a contrast of the output color data corresponding to the CMYK data representing a black-character color more than a contrast of the output color data corresponding to the CMYK data representing a non-black-character color.

According to one of two types of the above-mentioned contrast emphasizing unit, there is provided according to another aspect of the present invention a color converting device converting input CMYK data into output color data in a predetermined different format, the device comprising:

a color conversion profile representing a correspondence of the CMYK data with the output color data; and a color converting unit converting the CMYK data into the output color data by referring to the color conversion profile, wherein the color conversion profile has a characteristic of emphasizing a contrast of the output color data corresponding to the CMYK data representing a black-character color more than a contrast of the output color data corresponding to the CMYK data representing a non-black-character color.

According to the other of the two types of the above-mentioned contrast emphasizing unit, there is provided according to another aspect of the present invention a color converting device converting input CMYK data into output color data in a predetermined different format, the device comprising:

a CMYK/colorimetric-value conversion unit converting the CMYK data into a colorimetric value to be measured with respect to an image formed from the CMYK data by an image forming device;

a black-character color judging unit judging whether or not the CMYK data represents a black-character color;

a colorimetric value correction unit correcting the colorimetric value by performing a contrast correction appropriate for a black-character color to the colorimetric value converted by the CMYK/colorimetric-value conversion unit from the CMYK data judged to represent the black-character color by the black-character color judging unit, and by performing a contrast correction appropriate for a non-black-character color to the colorimetric value converted by the CMYK/colorimetric-value conversion unit from the CMYK data judged to represent the non-black-character color by the black-character color judging unit; and a colorimetric-value/output-color-data conversion unit converting the colorimetric value corrected by the colorimetric value correction unit into the output color data, wherein a contrast of the output color data corresponding to the CMYK data judged to represent the black-character color is emphasized more than a contrast of the output color data corresponding to the CMYK data judged to represent the non-black-character color.

In order to achieve the above-mentioned objects, there is also provided according to another aspect of the present invention a color conversion profile creating device creating a color conversion profile used for converting CMYK data into output color data in a predetermined different format, the device comprising:

a CMYK data generation unit generating the CMYK data;

a colorimetric value converting unit converting the CMYK data generated by the CMYK data generation unit into a colorimetric value to be measured with respect to an image formed from the CMYK data by an image forming device;

a black-character color judging unit judging whether or not the CMYK data generated by the CMYK data generation unit represents a black-character color;

a colorimetric value correcting unit correcting the colorimetric value by performing a contrast correction appropriate for a black-character color to the colorimetric value converted by the colorimetric value converting unit from the CMYK data judged to represent the black-character color by the black-character color judging unit, and by performing a contrast correction appropriate for a non-black-character color to the colorimetric value converted by the colorimetric value converting unit from the CMYK data judged to represent the non-black-character color by the black-character color judging unit; and a color conversion profile setting unit setting the color conversion profile by using the colorimetric value corrected by the colorimetric value correcting unit, wherein the color conversion profile has a characteristic of emphasizing a contrast of the output color data corresponding to the CMYK data representing the black-character color more than a contrast of the output color data corresponding to the CMYK data representing the non-black-character color.

In order to achieve the above-mentioned objects, there is also provided according to another aspect of the present invention a color conversion profile creating method creating a color conversion profile used for converting CMYK data into output color data in a predetermined different format, the method comprising:

the CMYK data generating step of generating the CMYK data;

the colorimetric value converting step of converting the CMYK data generated by the CMYK data generating step into a colorimetric value to be measured with respect to an image formed from the CMYK data by an image forming device;

the black-character color judging step of judging whether or not the CMYK data generated by the CMYK data generating step represents a black-character color;

the colorimetric value correcting step of correcting the colorimetric value by performing a contrast correction appropriate for a black-character color to the colorimetric value converted by the colorimetric value converting step from the CMYK data judged to represent the black-character color by the black-character color judging step, and by performing a contrast correction appropriate for a non-black-character color to the colorimetric value converted by the colorimetric value converting step from the CMYK data judged to represent the non-black-character color by the black-character color judging step; and the color conversion profile setting step of setting the color conversion profile by using the colorimetric value corrected by the colorimetric value correcting step, wherein the color conversion profile has a characteristic of emphasizing a contrast of the output color data corresponding to the CMYK data representing the black-character color more than a contrast of the output color data corresponding to the CMYK data representing the non-black-character color.

According to the present invention, CMYK data of an image forming device, such as a color printer or a color copying machine, containing black-character parts and non-black-character parts undergoing different color reproduction methods can be appropriately converted into color data in a different format, which enables a high-quality black character reproduction in displaying on a display or printing from another color printer.

In order to achieve the above-mentioned objects, there is also provided according to another aspect of the present invention a color converting device converting an input color signal into an output color signal (RGB) by dividing an 4-dimensional input color space (CMYK) into a plurality of 16-vertex units to be selected according to higher-order data of the input color signal, dividing one of the 16-vertex units into a plurality of six 8-vertex solids (T1 to T6) to be selected according to lower-order data of the input color signal, and performing an interpolative calculation using interpolation coefficients (P0 to P15) corresponding to one of the 8-vertex solids to which the input color signal belongs, the device comprising:

storing means for storing 4-dimensional interpolation coefficients (P0 to P15) corresponding to each of the 8-vertex solids (T1 to T6);

determining means for determining which one of the 8-vertex solids the input color signal belongs to according to a magnitude relation among the lower-order data;

reading means for reading the 4-dimensional interpolation coefficients corresponding to the determined one of the 8-vertex solids from the storing means;

generating means for generating 3-dimensional interpolation coefficients (Pa to Pd) used for a 3-dimensional interpolative calculation from the 4-dimensional interpolation coefficients; and interpolating means for performing the 3-dimensional interpolative calculation by using the lower-order data and the 3-dimensional interpolation coefficients.

According to the present invention, the color converting device enables a color conversion of an input signal having four dimensions or more to be performed at high speed even by means of a CPU, and also enables the selection from among the polyhedral units to be performed at high speed.

According to the present invention, the color converting device also enables a color conversion of such a color signal as multiband data containing a multitude of color components to be performed at high speed.

According to the present invention, the color converting device also enables a sum-of-products calculation suitable for a CPU processing to be performed at high speed.

According to the present invention, the color converting device also enables a color conversion of an multi-dimensional input signal to be performed at high speed even by means of a CPU incapable of accelerating a sum-of-products calculation.

According to the present invention, the color converting device shortens an access time of a lookup table upon performing a color conversion of an input signal having four dimensions or more.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Embodiment of an Image Processing System

Figure 1:
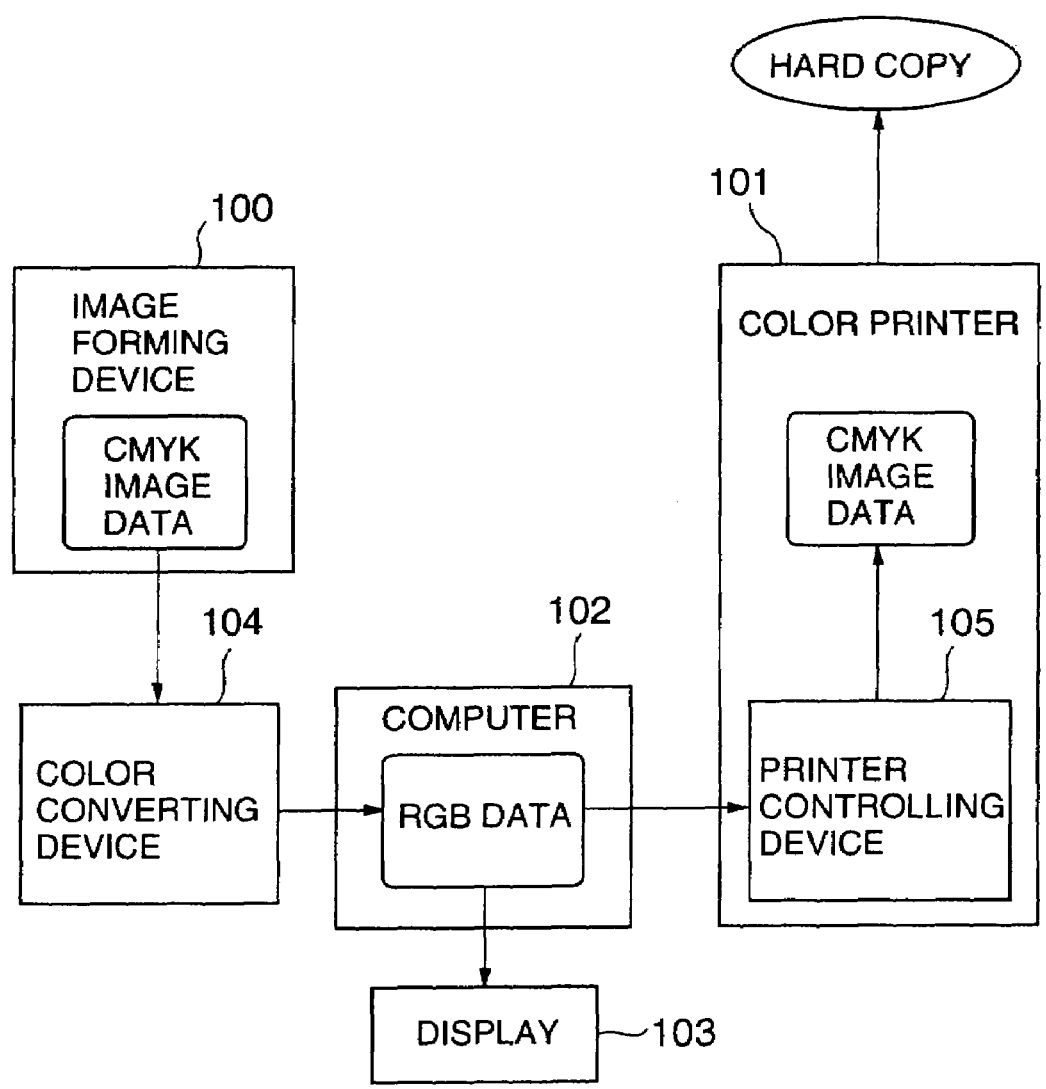
FIG. 1 is a schematic diagram of an embodiment of an image processing system according to the present invention.

FIG. 1 is a schematic diagram of an embodiment of an image processing system according to the present invention. In FIG. 1, an image forming device 100 forms an image by using CMYK data for outputting a hard copy thereof. Specifically, the image forming device 100 is a color printer, a color copying machine, a color facsimile device, etc. The image forming device 100 can output the above-mentioned CMYK data to a color converting device 104 of the present invention. The color converting device 104 has a color-converting function of converting the CMYK data into RGB data. A computer 102 is a personal computer, etc. Software including various applications and printer drivers can be installed into the computer 102. The computer 102 can display the RGB data transmitted from the color converting device 104 on a display 103. The computer 102 can also output the RGB data to a color printer 101 by activating a printer driver corresponding to the color printer 101. The color printer 101 receives the drawing data of the RGB format from the computer 102, and outputs a hard copy thereof. This color printer 101 incorporates a printer controlling device 105 converting the drawing data of the RGB format received from the computer 102 into CMYK data used for printing.

Besides, the printer controlling device 105 can be provided as a device independent from the color printer 101. Further, part of functions of the printer controlling device 105 can be taken over by the printer driver of the computer 102, etc.

Similarly, although the color converting device 104 of the present invention can be provided as an independent device, the function of the color converting device 104 may be executed by means of software in the computer 102, for example. Further, the color converting device 104 can be mounted in the image forming device 100. The scope of the present invention embraces the image forming device 100 thus incorporating the color converting device 104.

Next, a description will be given of operations of the above-mentioned image processing system as a whole. The image forming device 100 stores the CMYK data generated in the process of outputting a hard copy, in a built-in hard disk. An operation of outputting a hard copy means a printing operation using a color printer or a copying operation using a color copying machine, for example. The CMYK data generated in the image forming device 100 is transferred to the color converting device 104 upon the generation thereof or when ordered to be transferred. The color converting device 104 converts the CMYK data into the RGB data by performing a color conversion to the CMYK data, and transmits the RGB data to the computer 102 immediately or when ordered to transmit the RGB data. The computer 102 retains the RGB data in a storage medium such as a hard disk provided therein. An operator of the computer 102 can view an image of the RGB data by displaying the RGB data stored in the computer 102 on the display 103 as occasion arises, can process the RGB data by using suitable applications, and can supply the original RGB data or the processed RGB data to the color printer 101 so as to have the RGB data printed.

[Description of the Image Forming Device 100: as a Color Printer]

Next, a description will be given, with reference to FIG. 2, of operations of generating the CMYK data, and structures related thereto, when the image forming device 100 is a color printer.

Figure 2:
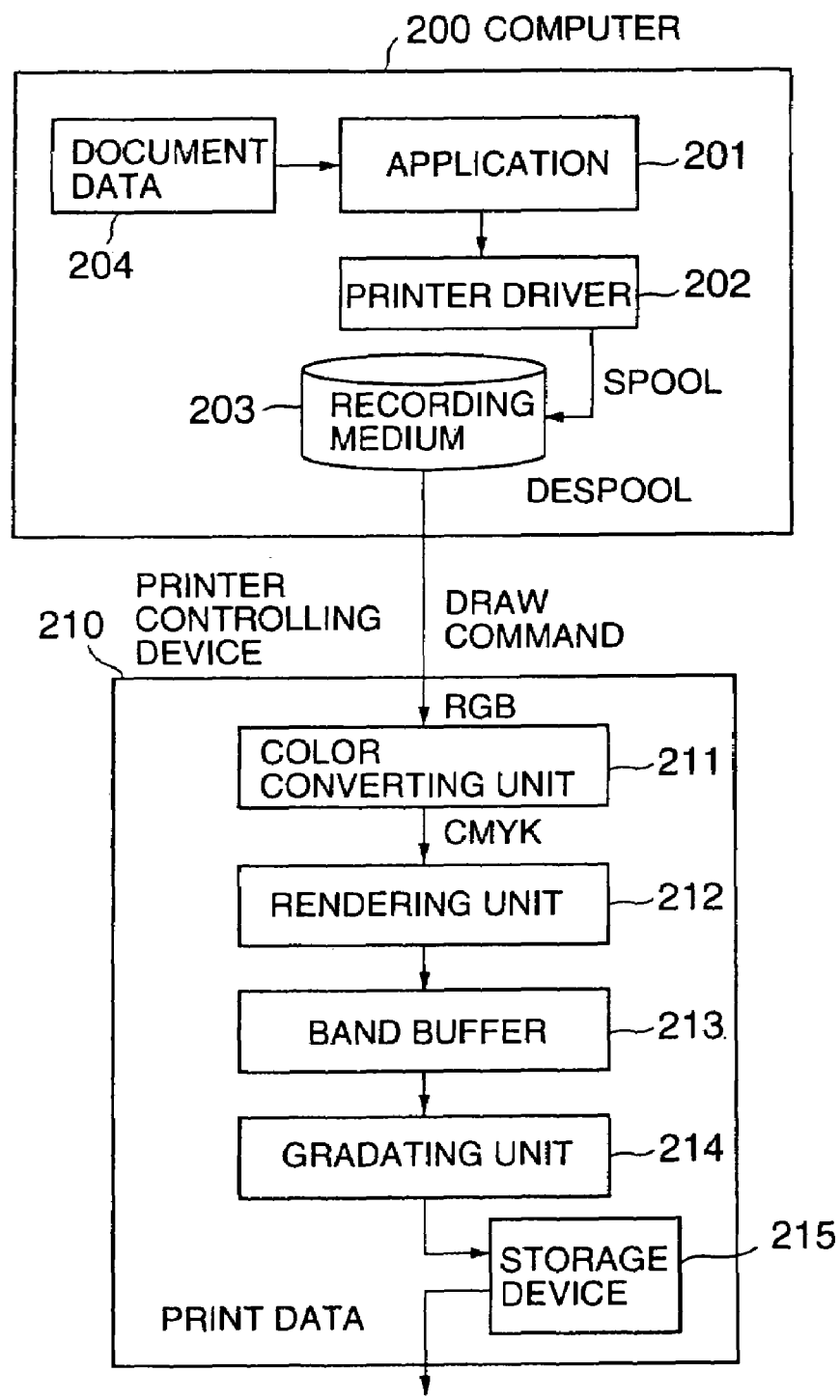
FIG. 2 is a block diagram used for explaining a process of generating print data of a color printer, and a printer controlling device.

In FIG. 2, a computer 200 transmits a draw command to the image forming device 100, and is connected to the image forming device 100 via an interface cable or a network. It is noted that the computer 102 shown in FIG. 1 can function as this computer 200. A printer controlling device 210 of the image forming device 100 may have a similar configuration to that of the printer controlling device 105 of the color printer 101 shown in FIG. 1, and comprises a color converting unit 211, a rendering unit 212, a band buffer 213, a gradating unit 214, and a storage device 215, for example. This printer controlling device 210 may be mounted in the image forming device 100, or may be an independent device. Further, part of functions of the printer controlling device 210 can be taken over by a printer driver of the computer 200, etc.

An operator of the computer 200 can edit or create document data 204 by using such means as an application 201 installed in the computer 200. After completing the document data 204, the operator orders a printing so as to print the document data 204 by using the image forming device 100. When the computer 200 receives a printing command via the application 201, the computer 200 transmits the document data edited or created in the application 201 to a printer driver 202. The printer driver 202 converts the document data into a draw command of an RGB format so as to make the document data receivable by the printer controlling device 210, temporarily stores the draw command of the RGB format in a recording medium 203, such as a hard disk, if necessary, and transmits the draw command of the RGB format to the printer controlling device 210 in synchronization with printing operations of the color printer (the image forming device 100).

When the printer controlling device 210 receives the draw command, the printer controlling device 210 converts the draw command of the RGB format into a draw command of a CMYK format in the color converting unit 211. In this process, the color converting unit 211 performs a color conversion process appropriate for attributes of draw objects while interpreting the draw command, and transmits the obtained draw command of the CMYK format to the rendering unit 212. The rendering unit 212 converts the data of the command format into CMYK data of a raster format, and stores the CMYK data in the band buffer 213. The CMYK data of the raster format is read from the band buffer 213, and is subjected to a gradation conversion in the gradating unit 214. The gradating unit 214 applies such a process as a dither to the CMYK data so as to convert the CMYK data into print data having a number of gradations processible by an image-forming engine of the image forming device 100, and temporarily stores the print data in the storage device 215, such as a hard disk. For example, in a case where the image-forming engine of the image forming device 100 forms a hard copy by using inks of C (cyan), M (magenta), Y (yellow) and K (black) where each of the colors can be shaded in 256 gradations, the CMYK data of the raster format representing each of the colors in 8 bits is stored in the storage device 215 as the print data. In another case where the CMYK data is binarized by a dither process, the CMYK data of the raster format representing each of the colors in one bit is stored in the storage device 215. Thereafter, the CMYK data is read from the storage device 215 in timing with a printing speed of the image forming device 100, and is printed out as a hard copy by the image-forming engine.

Hereinbelow, a specific description will be of the (object-suited) color conversion process appropriate for various attributes of draw objects performed in the color converting unit 211. Obtaining a high-definition hard copy generally requires different color reproduction methods to be used in accordance with different attributes of objects. Especially, different color reproduction methods are generally used to reproduce the color of a black character and to reproduce the color of a gradational image such as a photographic image, even though both are black (R=G=B=0) as RGB data. In other words, reproducing a black character by using the four colors of CMYK causes a problem of displacement of dots of each color upon outputting a hard copy resulting in a blurred character which is hard to read. In addition, when reproducing a black character by overlapping the four colors, it is difficult to maintain a balance among the four colors, causing a problem of unwanted appearances of the colors in the black character. On the other hand, reproducing a black color in a shadow area of a photographic image only by using an ink of K (black) causes a problem of discontinuous gradations because it is hard to maintain a continuity of the black-colored part with other chromatic-colored parts. Therefore, different color reproduction methods are generally used in which a black character is reproduced solely by the color of K (black) while a black part in a photographic image character is reproduced by using the four colors of CMYK.

However, a high-quality black character reproduction cannot be achieved in displaying on the display 103 or reprinting from the other color printer 101 simply by converting the CMYK data optimized for a hard-copy output by the above-mentioned object-suited color conversion process into, for example, RGB data without any contrivances, and supplying the RGB data to the computer 102. Thereupon, the color converting device 104 of the present invention performs a color conversion converting the CMYK data optimized by the above-mentioned object-suited color conversion process (or CMYK data subjected to an image area separation process in a color copying machine described hereinafter in detail) into, for example, RGB data which enables a high-quality black character reproduction in displaying on the display 103 or reprinting from the other color printer 101.

First Embodiment of the Color Converting Device 104

Figure 3:
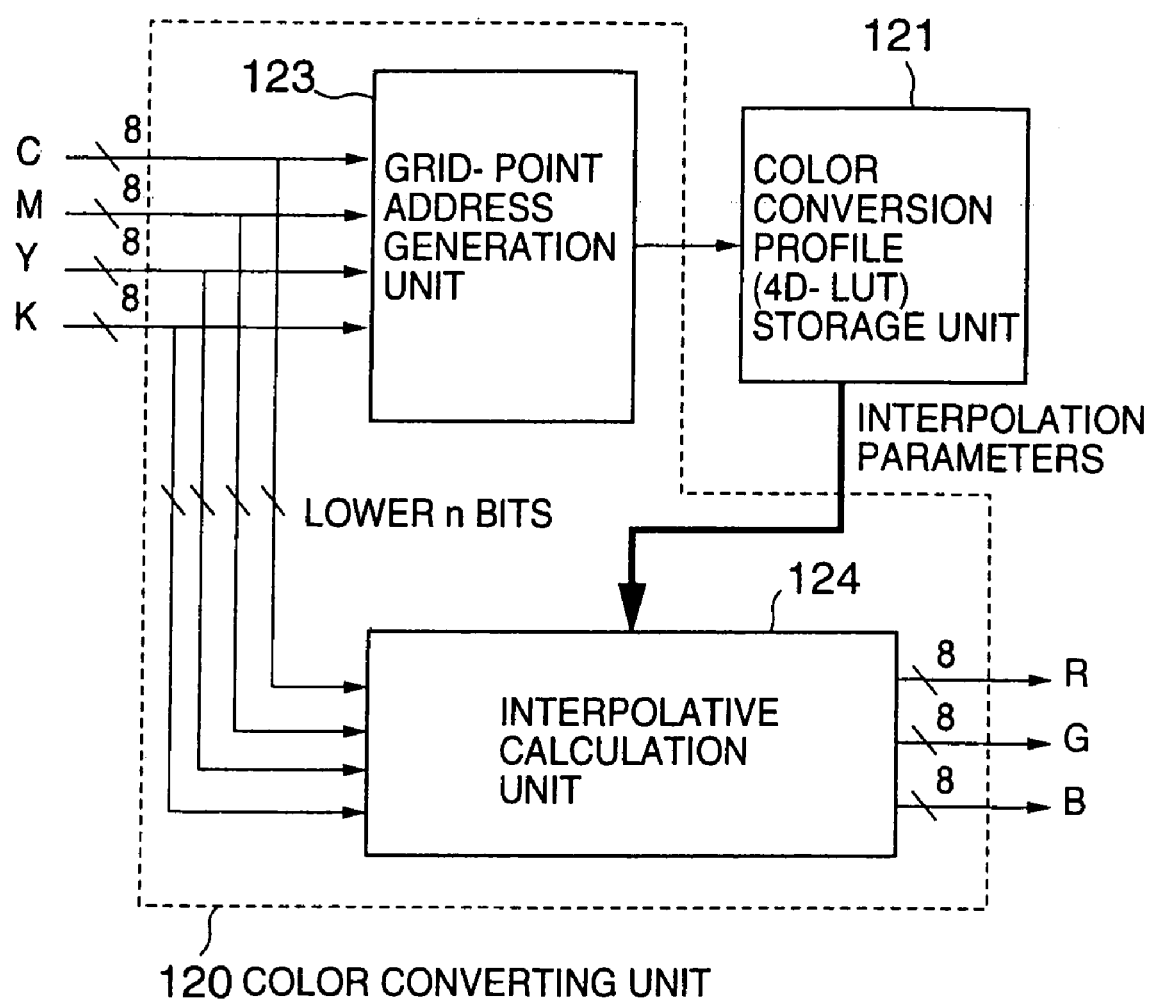
FIG. 3 is a block diagram of a first embodiment of a color converting device according to the present invention.

FIG. 3 is a block diagram of a first embodiment of the color converting device 104 according to the present invention. In FIG. 3, the color converting device 104 comprises a color converting unit 120 and a color conversion profile storage unit 121. The color converting unit 120 and the color conversion profile storage unit 121 together form a contrast emphasizing unit. The color conversion profile storage unit 121 stores a color conversion profile representing correspondences of CMYK data as input data with RGB data as output color data. The color converting unit 120 refers to the color conversion profile so as to convert input CMYK data into output RGB data.

According to the present invention, the color conversion profile storage unit 121 stores the color conversion profile having a characteristic of emphasizing a contrast of RGB data (output color data) corresponding to CMYK data representing a black-character color (the color of a black character) more than a contrast of RGB data corresponding to CMYK data representing a non-black-character color. Accordingly, the CMYK data representing the black-character color is converted into the RGB data with the emphasized contrast. Therefore, a high-quality black character reproduction can be achieved in displaying on the display 103 or printing on the color printer 101 by the color converting device 104 of the present invention converting the CMYK data subjected to the above-mentioned object-suited color conversion process (as CMYK data for printing in a color printer) into the above-mentioned RGB data, and supplying the RGB data to the computer 102. Besides, colors other than the black-character color are reproduced faithfully with subdued contrasts.

The color converting device 104 of the present invention adopts a memory map interpolative calculation method using a widely known four-dimensional lookup table (4D-LUT). Accordingly, the color conversion profile storage unit 121 stores the color conversion profile as a four-dimensional lookup table. The color converting unit 120 comprises a grid-point address generation unit 123 and an interpolative calculation unit 124. The grid-point address generation unit 123 generates addresses of vertices of an interpolation solid to which an input color represented by input CMYK data belong (representative points in a four-dimensional color space defined by four CMYK components; hereinafter referred to as grid points) by using higher-order bits and lower-order bits of the input CMYK data (e.g., 8 bits for each of the colors), and supplies the addresses to the color conversion profile storage unit 121. The interpolative calculation unit 124 performs an interpolative calculation by using grid-point output values (interpolation parameters) read from the color conversion profile storage unit 121 and using lower n bits of the CMYK data so as to calculate a value of RGB data corresponding to the CMYK data.

Besides, publicly known documents related to the memory map interpolative calculation method adopted in the present embodiment include publications of Japanese Laid-Open Patent Application No. 57-208765 and Japanese Patent No. 2,903,808. These publications disclose a five-point interpolation method for realizing a highly precise color conversion throughout a color space. The five-point interpolation method comprises the steps of dividing a four-dimensional color space defined by four color components into a plurality of five-vertex solids, selecting a five-vertex solid including an input color by using higher-order bits of input data, and reading an interpolative calculation intensity corresponding to the selected five-vertex solid from a four-dimensional lookup table so as to perform a linear interpolative calculation. The color converting unit 120 of the present embodiment may perform a similar interpolative calculation method. That is, since the feature of the present embodiment lies in the characteristic of the color conversion profile used in the interpolative calculation, no further description will be given of the interpolative calculation.

Embodiments of a Device and a Method of Creating the Color Conversion Profile Next, a description will be given of a device and a method of creating the color conversion profile (the four-dimensional lookup table) having the above-described characteristic which is to be stored in the color conversion profile storage unit 121 shown in FIG. 3.

Figure 4:
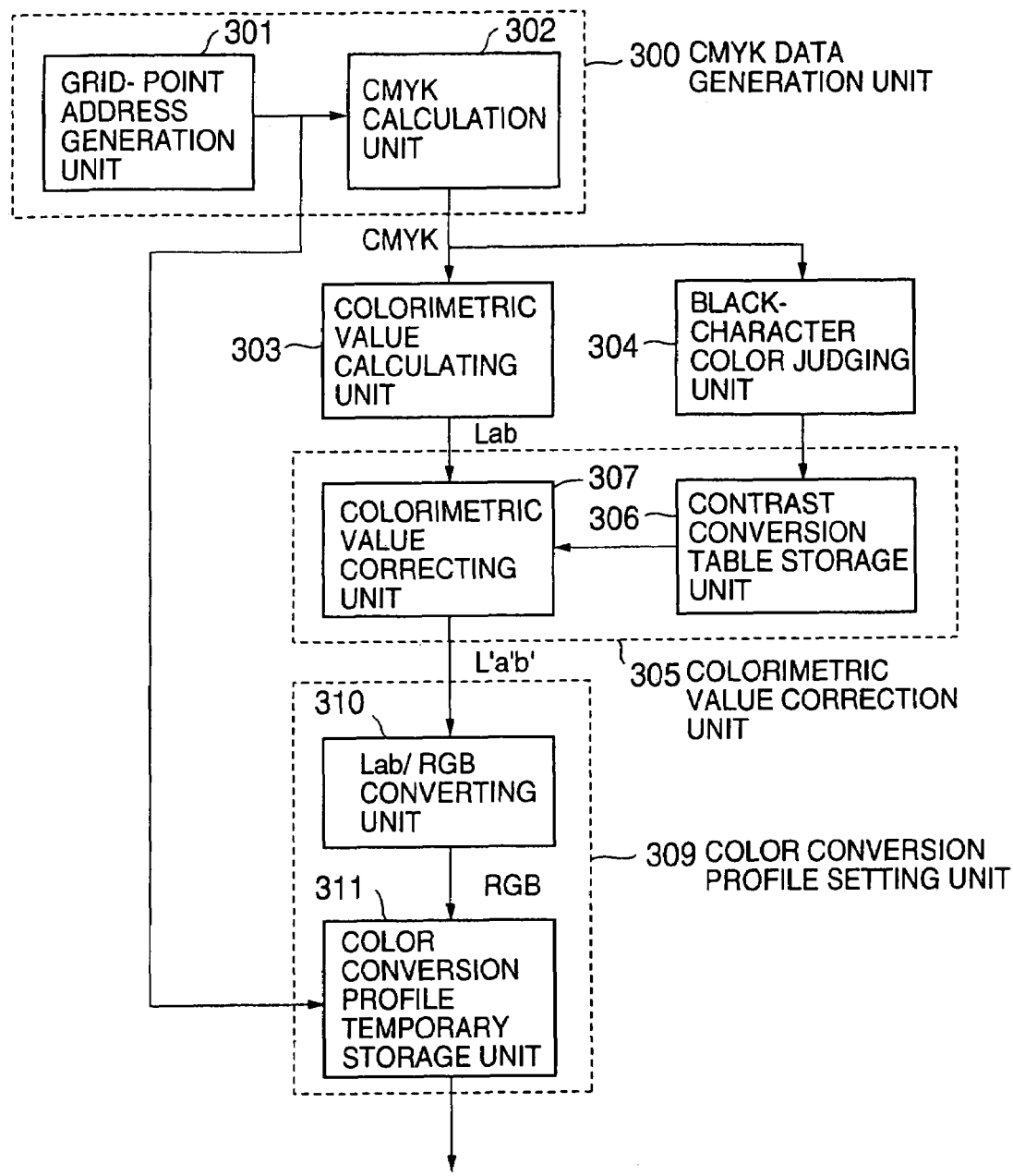
FIG. 4 is a block diagram of an embodiment of a color conversion profile creating device according to the present invention.
Figure 5:
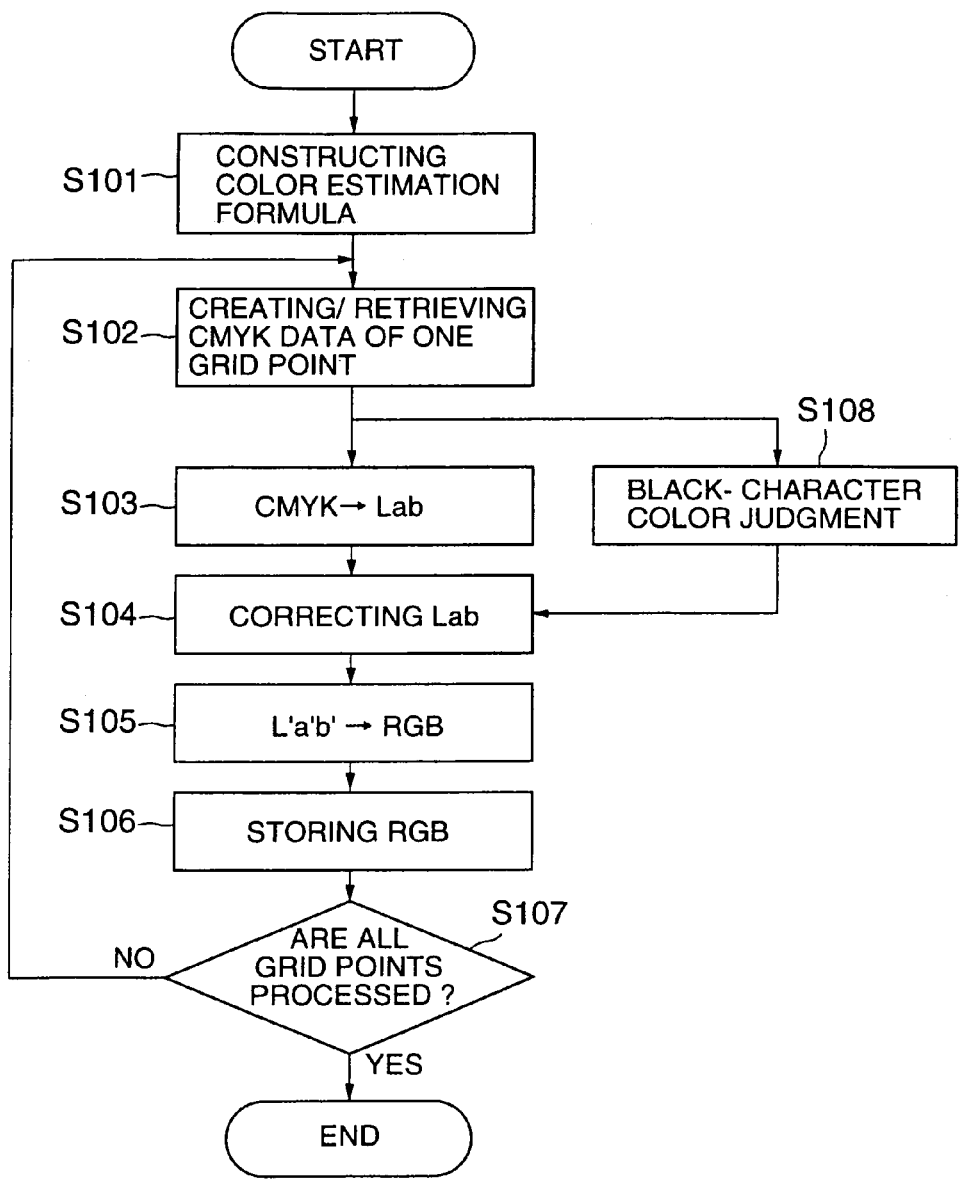
FIG. 5 is a flow chart of an embodiment of a color conversion profile creating procedure according to the present invention.

FIG. 4 is a block diagram of an embodiment of a color conversion profile creating device according to the present invention. FIG. 5 is a flow chart of an embodiment of a color conversion profile creating procedure according to a color conversion profile creating method of the present invention. The color conversion profile creating device shown in FIG. 4 performs step S102 and the following steps shown in FIG. 5.

It is noted that the color conversion profile creating device may be mounted to the color converting device 104 or the image forming device 100, or may be provided as an independent device. The present invention encompasses the color converting device 104 or the image forming device 100 thus incorporating the color conversion profile creating device.

In FIG. 4, a CMYK data generation unit 300 is a means for performing the step S102 shown in FIG. 5. In the present embodiment, the CMYK data generation unit 300 comprises a grid-point address generation unit 301 and a CMYK calculation unit 302. The grid-point address generation unit 301 is a counter generating indices (IDs) of grid points which are representative points in a four-dimensional color space defined by four CMYK color components. In the present embodiment where the number of grid points is 625, the grid-point address generation unit 301 counts from 0 to 624, and successively outputs each counted value as a grid-point ID. The CMYK calculation unit 302 calculates and outputs CMYK values corresponding to the grid-point ID. For example, in a case where the four-dimensional lookup table of the color conversion profile divides each of the CMYK color components into 16, the CMYK values of each grid point are generated by a step of 16. Specifically, corresponding to the grid-point IDs=0, 1, 2, 3 . . . , CMYK data is created as follows.

[C,M,Y,K]=[0,0,0,0], [0,0,0,16], [0,0,0,32], . . . [0,0,0, 255], [0,0,16,0], [0,0,16,16], [0,0,16,32], . . . [0,0,16, 255], . . . , . . . , [255,255,255,0], [255,255,255,16], [255, 255,255,32], . . . [255,255,255,255]

Besides, when this color conversion profile creating process is performed by means of software using a computer, it is possible to retrieve CMYK data of one grid point from a preliminarily prepared list of CMYK data of all grid points.

A colorimetric value calculating unit (a colorimetric value converting unit) 303 is a means for (performing a process equivalent to step S103 shown in FIG. 5) converting the CMYK data of each grid point generated in the CMYK calculation unit 302 into colorimetric values to be measured with respect to an image formed from the CMYK data by using the image forming device 100. This converting process can utilize a colorimetric result measured when the CMYK data of the grid point is output by the image forming device 100, or can use a color estimation formula (used for calculating colorimetric values from CMYK data according to an approximative function). A Lab value, an XYZ value, etc. can be used as the colorimetric value. The present embodiment employs the Lab value as the colorimetric value.

FIG. 5 shows step S101 as a procedure of obtaining the color estimation formula. A general method of constructing the color estimation formula is outputting a color patch by the image forming device 100 which is a source of CMYK data, measuring the color of the output patch by using a spectral calorimeter, and approximating a relationship between the colorimetric data and output color data (=CMYK values) of the color patch. Such an operation of constructing the color estimation formula as above is noting new, and can be performed manually, or semiautomatically. When the procedure shown in FIG. 5 is performed by means of software using a computer, the operation of constructing the color estimation formula may be performed beforehand, which leaves only a process of setting the color estimation formula to the step S101.

In order to improve reproducibility of a black character, it is necessary to recognize whether or not the CMYK data represents a black-character color. A black-character color judging unit 304 is a means for performing this recognition (equivalent to step S108 shown in FIG. 5). Since the CMYK data of the color printer is processed as described above such that a black character is reproduced solely by the color of K (black), it can be judged whether or not the CMYK data represents a black-character color by inspecting whether or not the CMYK data consists solely of a black-character color. Specifically, the black-character color judging unit 304 judges that the CMYK data does represent a black-character color when the values of the CMYK data are as follows:

$C \leq th, M \leq th, Y \leq th,$ and $K > 0$

In these expressions, th is a predetermined threshold value, which should be as follows in the present embodiment.

$th=0$

A colorimetric value correction unit 305 performs a process (equivalent to step S104 shown in FIG. 5) of determining a manner of correcting the colorimetric values according to a judgment result of the black-character color judging unit 304 so as to correct the colorimetric values. Specifically, when the judgment result indicates that the CMYK data represents a black-character color, the colorimetric value correction unit 305 performs a contrast correction for emphasizing a contrast of the colorimetric values so as to improve reproducibility of the black character. When the judgment result does not indicate that the CMYK data represents a black-character color, the colorimetric value correction unit 305 performs a contrast correction for subduing the contrast of the colorimetric values so as to reproduce the non-black-character color faithfully. In the present embodiment, the colorimetric value correction unit 305 comprises a contrast conversion table storage unit 306 and a colorimetric value correcting unit 307. The contrast conversion table storage unit 306 stores a contrast conversion table used for a black-character color and a contrast conversion table used for a non-black-character color. The colorimetric value correcting unit 307 uses either of the contrast conversion tables stored in the contrast conversion table storage unit 306 selected according to the judgment result of the black-character color judging unit 304 so as to perform the contrast correction to the colorimetric values.

A color conversion profile setting unit 309 uses colorimetric values L'a'b' corrected by the colorimetric value correction unit 305 so as to set a color conversion profile used for converting the CMYK data into RGB data. In the present embodiment, the color conversion profile setting unit 309 comprises an Lab/RGB converting unit 310 and a color conversion profile temporary storage unit 311. The Lab/RGB converting unit 310 converts the colorimetric values L'a'b' into RGB data. The color conversion profile temporary storage unit 311 stores the converted RGB data as the grid-point output values at addresses corresponding to the grid-point IDs generated by the grid-point address generation unit 301 into the form of a four-dimensional lookup table. The converting process performed by the Lab/RGB converting unit 310 is equivalent to step S105 shown in FIG. 5. The operation of storing the converted RGB data in the color conversion profile temporary storage unit 311 is equivalent to step S106 shown in FIG. 5. The above-described color conversion profile creating device repeats the steps S102 to S106 including the step S108 for all of the grid points. In FIG. 5, the completion of this repetition is judged in step S107.

The color conversion profile thus created as the four-dimensional lookup table in the color conversion profile temporary storage unit 311 is written to the color conversion profile storage unit 121 of the color converting device 104 of the present invention shown in FIG. 3 so that the CMYK data representing the black-character color is converted into the RGB data with an emphasized contrast, as described with reference to FIG. 3.

Figure 6:
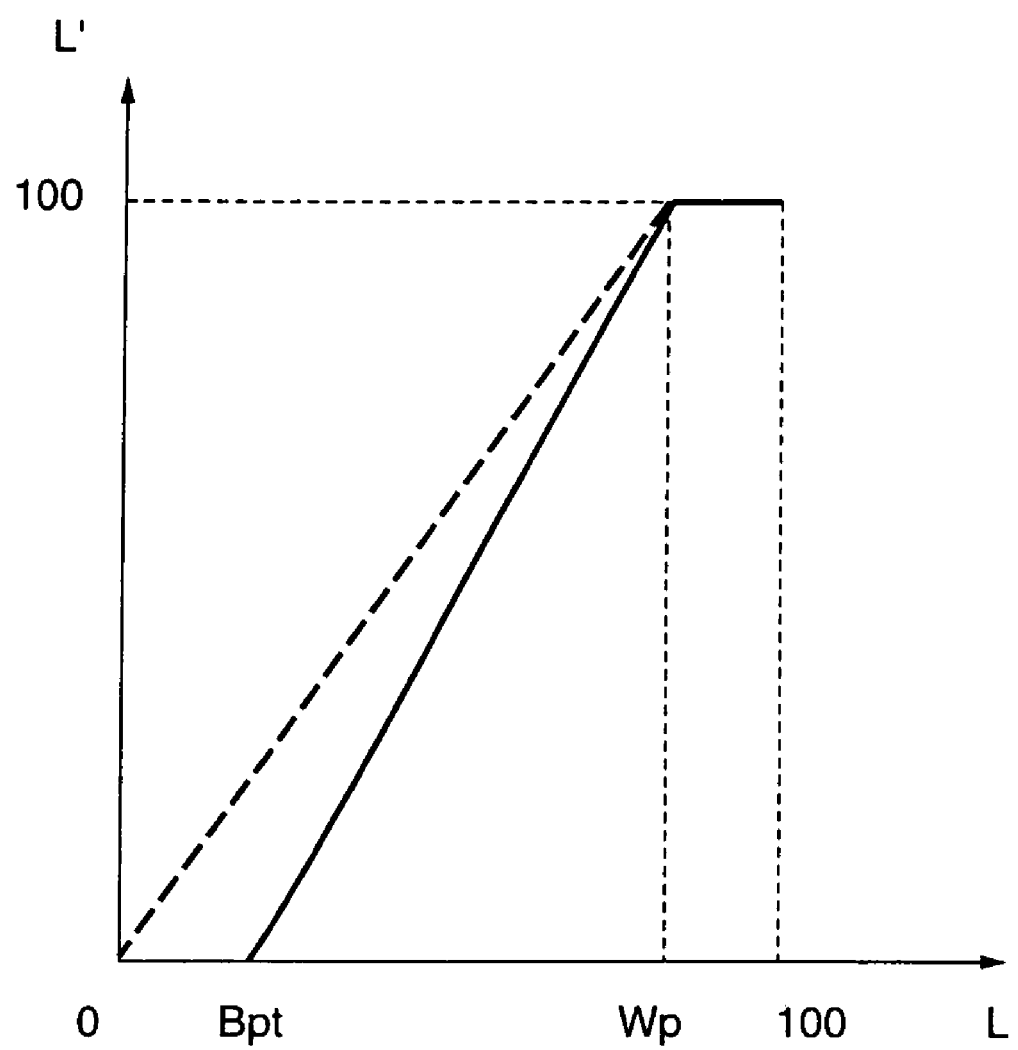
FIG. 6 is a graph used for explaining an example of a contrast conversion table.

Next, a description will be given, with reference to FIG. 6, of a specific method of correcting the colorimetric values in the colorimetric value correction unit 305. In FIG. 6, the axis of abscissas indicates a luminosity L before correction, and the axis of ordinates indicates a luminosity L' after correction. A solid line represents an input-output relationship with respect to a black-character color, and a dotted line represents an input-output relationship with respect to a non-black-character color. When the black-character color judging unit 304 judges that the CMYK data represents a black-character color, the colorimetric value correcting unit 307 corrects the colorimetric values Lab to the colorimetric values L'a'b' with an emphasized contrast by linearly transforming a range [Bpt-Wp] of the luminosity L to a range [0-100], as indicated by the solid line. In FIG. 6, Wp is a white point (a luminosity when C=M=Y=K=0) of the CMYK data, which is generally equivalent to a luminosity of a ground color. Bpt is a black point which is equivalent to an output luminosity when C=M=Y=0 and K=255. On the other hand, when the black-character color judging unit 304 judges that the CMYK data represents a non-black-character color, the colorimetric value correcting unit 307 linearly transforms a range [0-Wp] of the luminosity L to the range [0-100], as indicated by the dotted line. Applying this contrast correction enables the creation of the color conversion profile capable of reproducing a black character and a non-black character with a dynamic range appropriate for each thereof.

To describe further, since the above-mentioned contrast correction linearly transforms the luminosity of the white point of the CMYK data to 100, the ground color of a paper is transformed to a white color of a display so as to reproduce an image with an excellent visibility. Also, upon outputting from another color printer, no ink is applied to the ground-color part; this not only saves ink, but also enables a high-quality color reproduction free from a rough surface. In addition, whereas the above-mentioned contrast correction transforms the luminosity L of a black-character color ([C,M,Y,K]=[0,0,0,255]) to the luminosity [L'=0], the contrast correction does not correct the black point of a non-black-character color. Accordingly, a black character can be reproduced with an excellent legibility due to an emphasized contrast. On the other hand, colors of parts other than a black character can be reproduced faithfully without impairing a gradation in a shadow area.

The contrast conversion table storage unit 306 stores the two types of the contrast conversion tables corresponding to the solid line and the dotted line shown in FIG. 6 as one-dimensional lookup tables, and the colorimetric value correcting unit 307 can select and use either of the contrast conversion tables according to the black-character color judgment result. However, the present invention is not limited thereto. That is, since the conversion of the colorimetric values only requires the values of the white point Wp and the black point Bpt, the contrast conversion table storage unit 306 may only store the values of the white point Wp and the black point Bpt such that the colorimetric value correcting unit 307 selects the stored value of Bpt when the CMYK data represents a black-character color, whereas the colorimetric value correcting unit 307 selects 0 as the value of Bpt when the CMYK data represents a non-black-character color so as to perform the linear transformations with respective dynamic ranges in the contrast correction.

Additionally, since a K ink used in such an apparatus as a color printer sometimes assumes some color, the relationship a=b=0 sometimes does not stand as to the colorimetric values Lab of the CMYK data corresponding to a black-character color. In this case, simply making the luminosity L' of the black-character color zero does not cause the relationship [L',a',b']=[0,0,0] to stand, which makes the CMYK data an inexistent-color signal that is possibly unable to be converted into RGB data. In order to solve this problem, it is effective to forcibly make the CMYK data an achromatic-color signal.

Thereupon, in another embodiment, with respect to a black-character color, the colorimetric value correcting unit 307 converts the colorimetric values Lab into [L',0,0] so as to make a chroma thereof zero. This is also one of features of the present invention. Performing this forcible achromatizing process enables a high-quality reproduction of a black character even when a K ink assuming some color is used in the color printer 101. This also applies to the following embodiment.

Second Embodiment of the Color Converting Device 104

In the first embodiment of the color converting device 104 described with reference to FIG. 3, the input CMYK data is a signal representing each of the colors in 8 bits (generally referred to as a multivalued signal).

Figure 7:
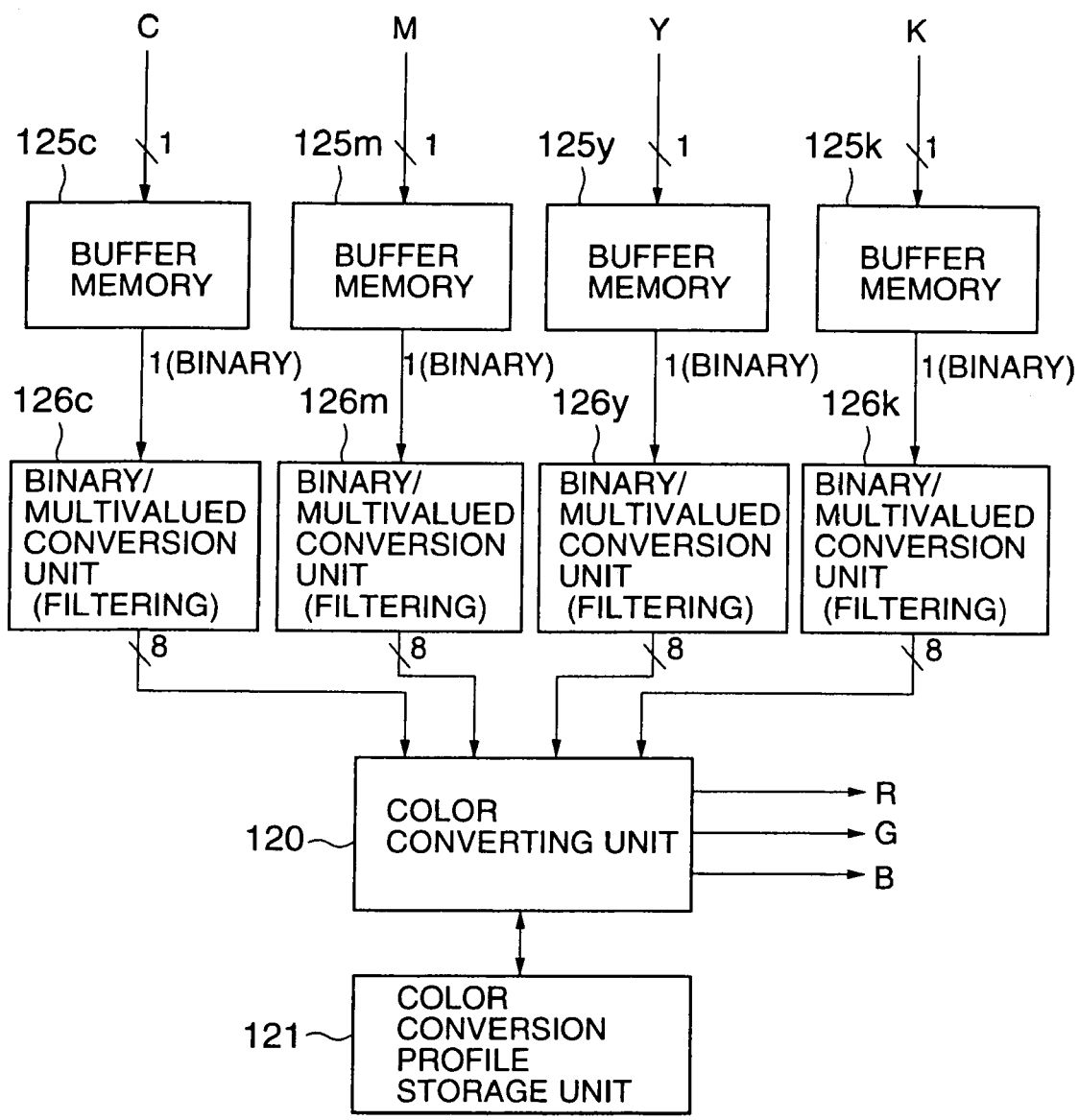
FIG. 7 is a block diagram of a second embodiment of the color converting device according to the present invention.

FIG. 7 is a block diagram of a second embodiment of the color converting device 104 for performing a color conversion of CMYK data binarized in a dither process. The color converting device 104 according to the present embodiment comprises buffer memories 125*c*, 125*m*, 125*y* and 125*k* corresponding to the CMYK color components, respectively, and binary/multivalued conversion units 126*c*, 126*m*, 126*y* and 126*k*, in addition to the color converting unit 120 and the color conversion profile storage unit 121 shown in FIG. 3. This color converting device 104 operates as follows.

A predetermined number of consecutive pixels of input binary CMYK data are temporarily stored in the buffer memories 125*c*, 125*m*, 125*y* and 125*k* corresponding to the color components, respectively. The binary CMYK data temporarily stored therein is successively supplied to the corresponding binary/multivalued conversion units 126*c*, 126*m*, 126*y* and 126*k*. The binary/multivalued conversion units 126*c*, 126*m*, 126*y* and 126*k* first replace "0" of the binary CMYK data with an 8-bit signal valued "0", or replace "1" of the binary CMYK data with an 8-bit signal valued "255", and then perform a smoothing filtering process to this 8-bit signal so as to generate CMYK data representing each of the colors in 8 bits and transmit the CMYK data to the color converting unit 120.

The color converting unit 120 operates in the same manner as in the above-described first embodiment. However, the contents of the color conversion profile (the four-dimensional lookup table) stored in the color conversion profile storage unit 121 are different from the first embodiment. Descriptions will be given, with reference to FIG. 8 and FIG. 9, of these different points.

Since the binary/multivalued conversion units 126*c*, 126*m*, 126*y* and 126*k* perform the above-mentioned smoothing filtering process, high-frequency components of the binary CMYK data are removed. As a result of this, especially character parts become obscure so as to deteriorate a legibility thereof, which makes small-sized characters difficult to read. A description will be given, with reference to FIG. 8, of this phenomenon.

Figure 8A:
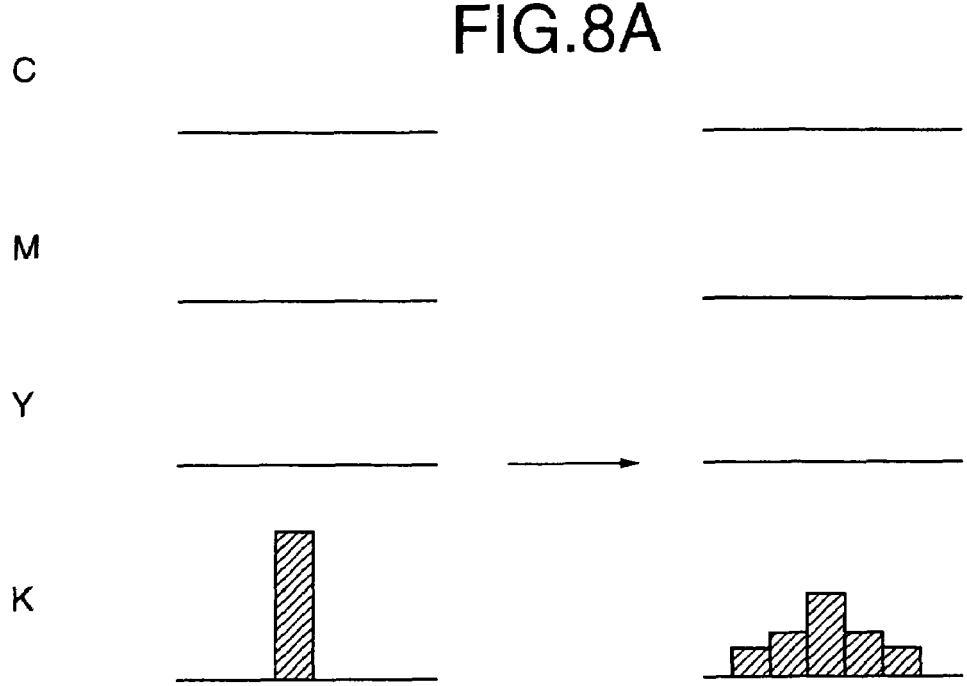
FIG. 8A is an illustration comparing binary CMYK data in a black-character part with multivalued data thereof.
Figure 8B:
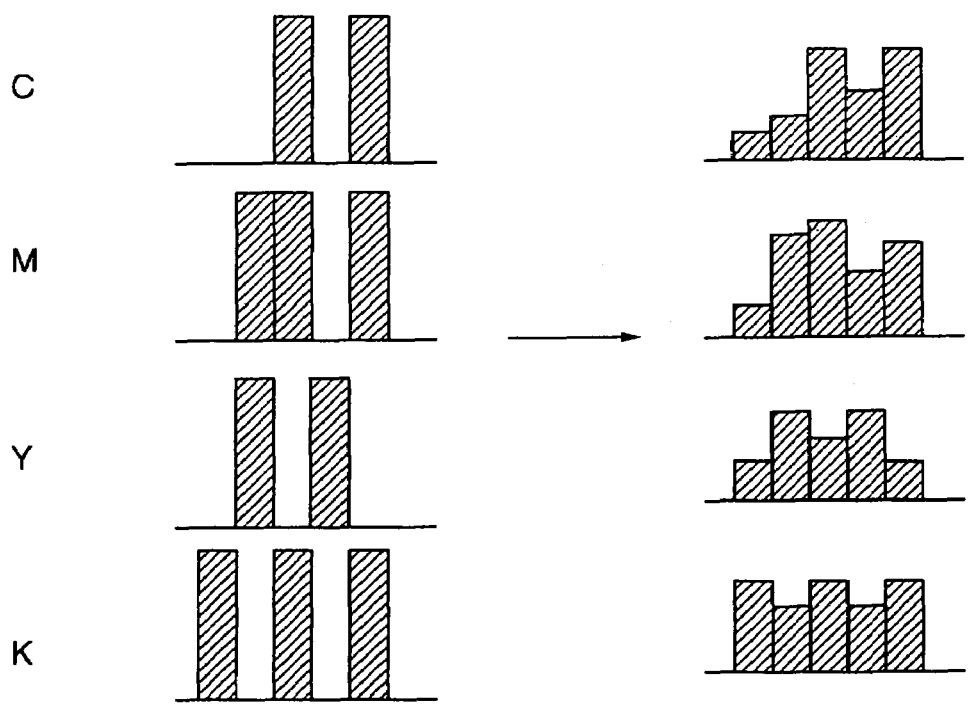
FIG. 8B is an illustration comparing binary CMYK data in a pictorial part with multivalued data thereof.

FIG. 8A and FIG. 8B illustrate changes in pixel values due to the smoothing filtering process performed to the binary CMYK data. FIG. 8A illustrates changes in pixel values in the vicinity of a black character. FIG. 8B illustrates changes in pixel values in a pictorial part. To simplify the illustrations, FIG. 8A and FIG. 8B show only five pixels in a horizontal direction. Graphs at the left side of arrows in FIG. 8A and FIG. 8B show pixel values of the binary CMYK data before the smoothing filtering process. Graphs at the right side of the arrows in FIG. 8A and FIG. 8B show pixel values of the 8-bit CMYK data after the smoothing filtering process. However, for the purpose of equalizing levels of the binary CMYK data and the 8-bit CMYK data, the graphs show "1" of the binary CMYK data and "255" of the 8-bit CMYK data at the same height.

In the left-side graphs shown in FIG. 8A, a black-character pixel ([C,M,Y,K]=[0,0,0,1]) is present at the center. Pixels around the black character are assumed to be paperwhite, each of which is [C,M,Y,K]=[0,0,0,1]. The 8-bit CMYK data obtained by performing the smoothing filtering process to the binary CMYK data represented in the left-side graphs has a decreased value for the black-character pixel, and has an increased density for an image consisting of the pixels around the black character, as shown in the right-side graphs shown in FIG. 8A. Thereby, the black character becomes dim.

In FIG. 8B, the right-side graphs show pixel values of the 8-bit CMYK data obtained by performing the smoothing filtering process to the binary CMYK data represented in the left-side graphs. The binary CMYK data binarized by a dither process has such a characteristic that CMYK inks are applied at intervals. Multivalued CMYK data before the dither process which represents the pictorial part does not contain plenty of high-frequency components. Accordingly, the 8-bit CMYK data obtained by performing the smoothing filtering process to the binary CMYK data merely returns to a state (of the multivalued CMYK data) before the dither process. Therefore, the smoothing filtering process does not deteriorate the pictorial parts very much, compared to character parts.

Thereupon, in the present embodiment, in the course of the color conversion profile creating device shown in FIG. 4 creating the color conversion profile to be stored in the color conversion profile storage unit 121, the colorimetric value correction unit 305 performs a nonlinear contrast conversion only to a black-character color so as to emphasize the contrast of the black character intensively. Using the color conversion profile thus formed largely enhances the reproducibility of a black-character part which tends to become obscure due to the smoothing filtering process. However, performing the nonlinear contrast conversion to pictorial parts other than characters greatly changes the colors of the pictorial parts. Therefore, the same linear contrast conversion as in the first embodiment is applied to the pictorial parts.

In addition, also in the course of creating the color conversion profile according to the present embodiment, the black-character color judging unit 304 can judge whether or not the CMYK data represents a black-character color in the same manner as described above in the first embodiment. However, if even only one color pixel exists in the vicinity of a black character, the relationship C=M=Y=0 does not stand. Thereupon, using nonzero values (e.g., 16) as the above-mentioned judgment threshold value th can prevent this undesired recognition. As a matter of fact, since the black character is often drawn on a white background or on a highlighted color, a black-character color and a non-black-character color can be distinguishingly recognized with high precision even by judging as above only from a balance of C, M, Y and K.

Figure 9:
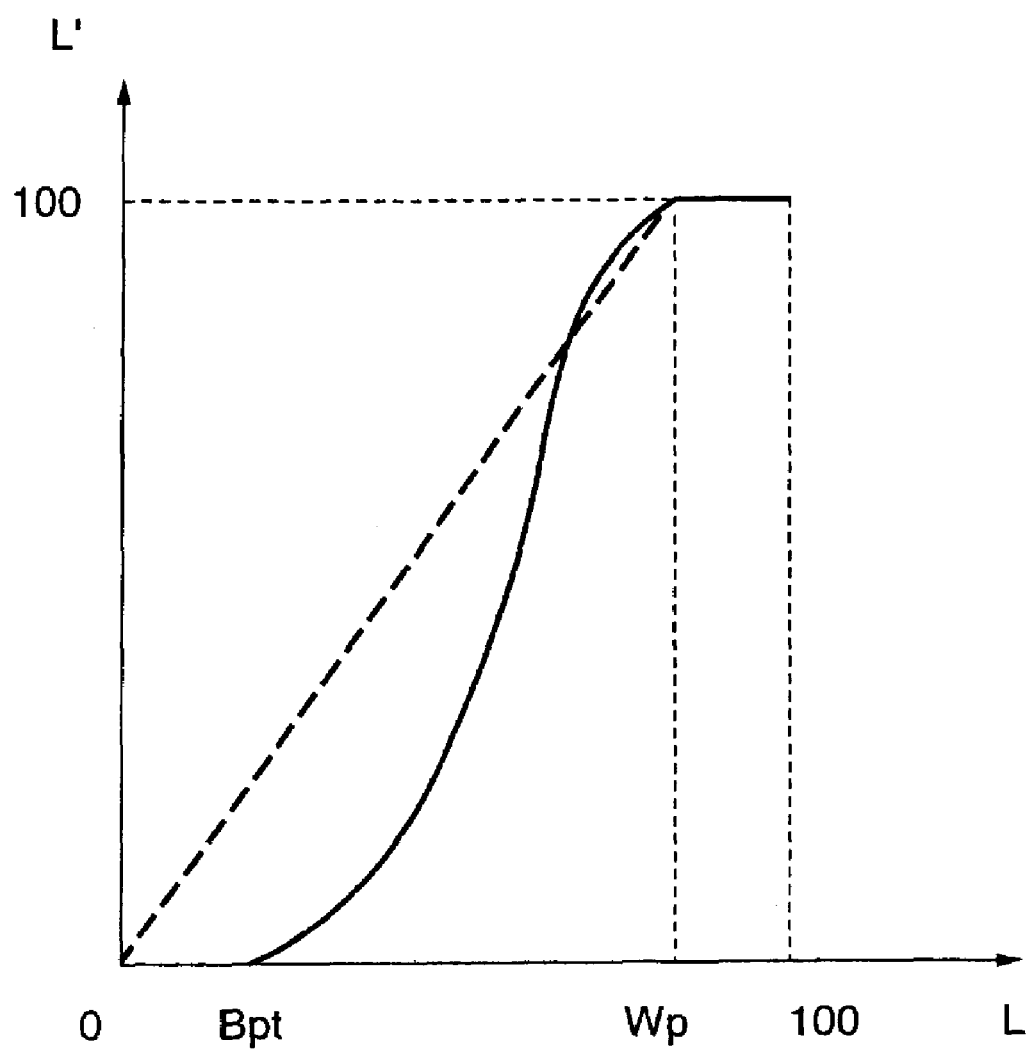
FIG. 9 is a graph used for explaining another example of a contrast conversion table.

A description will be given, with reference to FIG. 9, of a specific example of the nonlinear contrast conversion performed for the purpose of creating the color conversion profile used in the present embodiment. In FIG. 9, the axis of abscissas indicates a luminosity L before correction, and the axis of ordinates indicates a luminosity L' after correction, as in FIG. 6. A solid line represents an input-output relationship with respect to a black-character color, and a dotted line represents an input-output relationship with respect to a non-black-character color, also as in FIG. 6. The input-output relationship with respect to the non-black-character color is the same as in FIG. 6.

With respect to the black-character color, the colorimetric value correcting unit 307 intensively emphasizes the contrast of the black character by nonlinearly transforming a range [Bpt-Wp] of the luminosity L to a range [0-100], as indicated by the solid line. A color conversion performed by using the color conversion profile created by the above-described correction largely emphasizes the contrast of the black-character part. Accordingly, a character dimmed due to the smoothing filtering process can be restored to a considerably legible RGB image.

Besides, with respect to multivalued CMYK data, too, it is effective to intensively emphasizes the contrast of a black character by performing the nonlinear transformation shown in FIG. 9, depending on characteristics thereof.

Third Embodiment of the Color Converting Device 104

Figure 10:
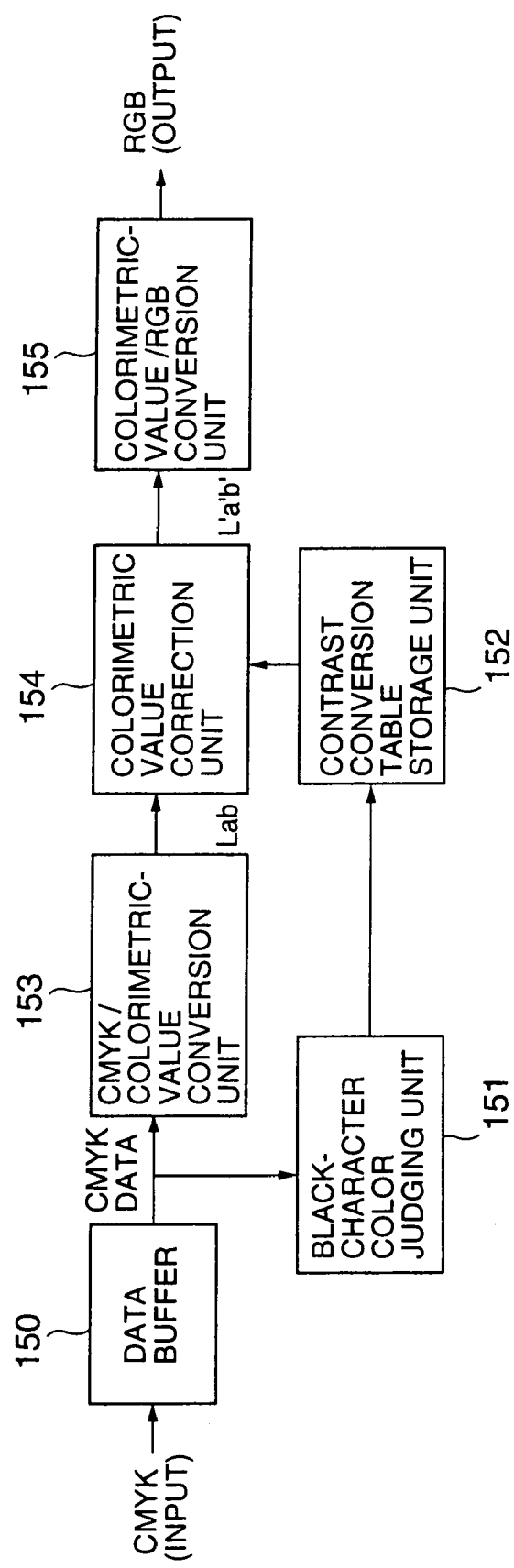
FIG. 10 is a block diagram of a third embodiment of the color converting device according to the present invention.

FIG. 10 is a block diagram of a third embodiment of the color converting device 104. The color converting device 104 according to the present embodiment comprises a data buffer 150, a black-character color judging unit 151, a contrast conversion table storage unit 152, a CMYK/colorimetric-value conversion unit 153, a colorimetric value correction unit 154, and a colorimetric-value/RGB conversion unit 155.

The CMYK data supplied from the image forming device 100 is temporarily stored in the data buffer 150, and is successively supplied to the black-character color judging unit 151 and the CMYK/colorimetric-value conversion unit 153. The black-character color judging unit 151 is a means for judging whether or not the CMYK data represents a black-character color in the same manner as the black-character color judging unit 304. The contrast conversion table storage unit 152 stores contrast conversion tables used for a black-character color and a non-black character color as shown in FIG. 6 (or FIG. 9). Either of the contrast conversion tables is selected according to a judgment result of the black-character color judging unit 151.

The CMYK/colorimetric-value conversion unit 153 converts the CMYK data into colorimetric values (Lab values in the present embodiment) of the image forming device 100 in the same manner as does the colorimetric value calculating unit 303 shown in FIG. 4, and supplies the colorimetric values to the colorimetric value correction unit 154. The colorimetric value correction unit 154 uses either of the contrast conversion tables stored in the contrast conversion table storage unit 152 selected according to the black-character color judgment result so as to perform the same contrast correction to the colorimetric values Lab as does the colorimetric value correcting unit 307 shown in FIG. 4, and outputs corrected colorimetric values L'a'b'.

Additionally, as described in relation to the colorimetric value correcting unit 307, in case a K ink used in such an apparatus as a color printer assumes some color, the colorimetric value correction unit 154 may convert the colorimetric values Lab of the CMYK data corresponding to a black-character color into [L',0,0] so as to forcibly achromatize the colorimetric values L'a'b'.

The colorimetric-value/RGB conversion unit 155 converts the colorimetric values L'a'b' corrected by the colorimetric value correction unit 154 into an RGB color signal.

It is evident that the above-described configuration enables a color conversion of the CMYK data into the RGB data which is equivalent to the above-described first embodiment.

Besides, though not shown in FIG. 10, the color converting device 104 according to the present third embodiment may further comprise means equivalent to the binary/multivalued conversion units 126c, 126m, 126y and 126k shown in FIG. 7 at an input side or an output side, wherein the contrast conversion table storage unit 152 stores a nonlinear contrast conversion table corresponding to the solid line shown in FIG. 9 used for a black-character color. As evident from the above description, the color converting device 104 having the above-described structure can generate RGB data with an excellent black-character reproducibility from the CMYK data binarized by such a process as a dither process, as in the second embodiment.

[Description of the Image Forming Device 100: as a Color Copying Machine]

Figure 11:
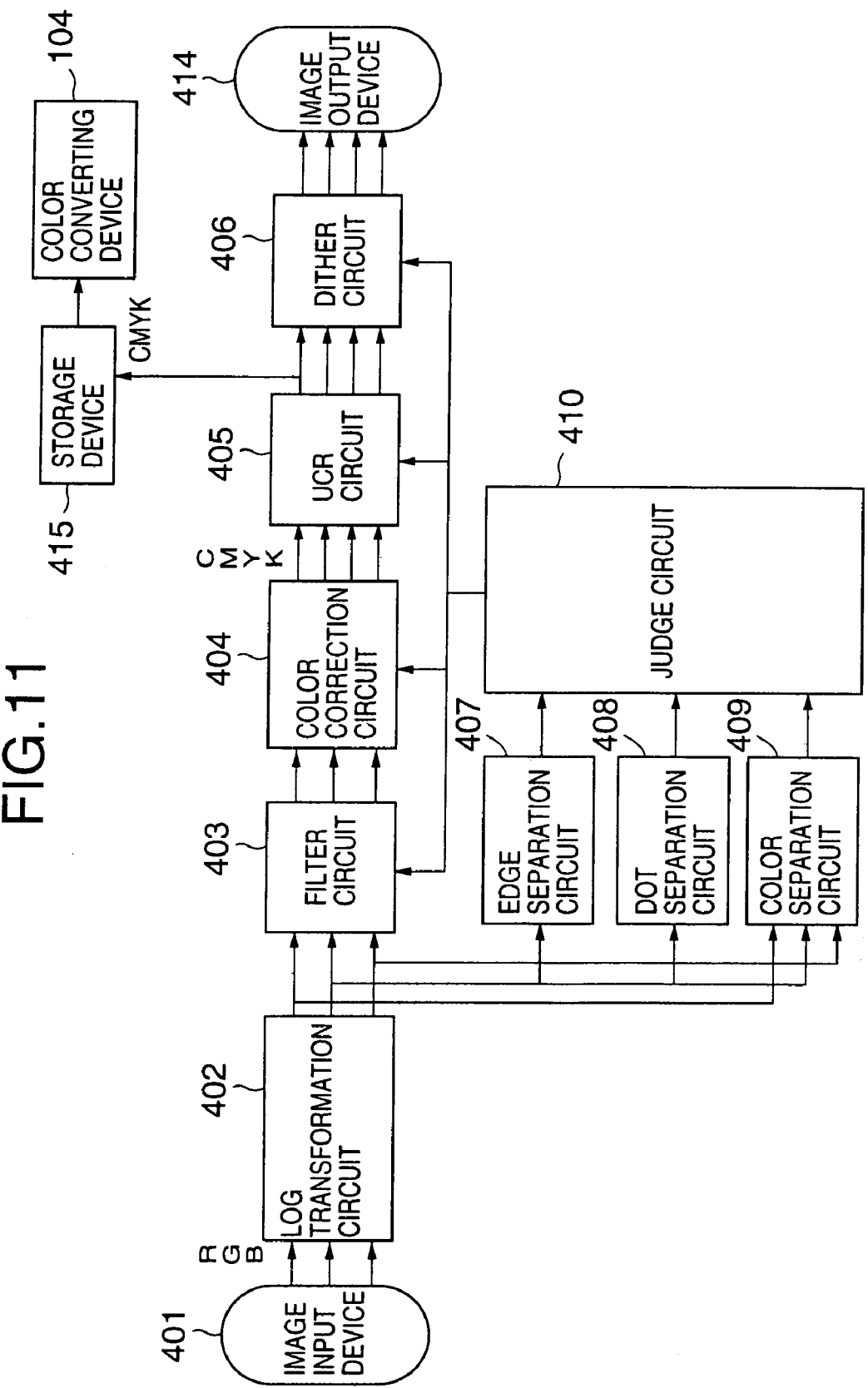
FIG. 11 is a block diagram of a configuration of a color copying machine.

FIG. 11 is a block diagram of a configuration of a color copying machine. A description will be given, with reference to FIG. 11, of operations of generating the CMYK data, and structures related thereto, when the image forming device 100 is a color copying machine.

In FIG. 11, an image input device (a scanner) 401 reads an image of a subject copy, and supplies RGB data. Since the RGB data is linear to reflectance, a Log transformation circuit 402 transforms the RGB data into data substantially linear to a density of the image by performing a logarithm transformation, and supplies the logarithm-transformed data to a filter circuit 403, an edge separation circuit 407, a dot separation circuit 408, and a color separation circuit 409. The circuits 407, 408 and 409 are provided for performing an image area separation process. A judge circuit 410 comprehensively judges separation results obtained by the circuits 407, 408 and 409, and classifies the separation results into image areas such as a black-character area, a photograph area, a dot area. For example, the separation result of the edge separation circuit 407 indicates "edge", and the separation result of the color separation circuit 409 indicates "black pixel", the judge circuit 410 judges that the separation results together indicate "black character". The judge circuit 410 supplies this image area separation result to the filter circuit 403, a color correction circuit 404, a UCR circuit 405, and a dither circuit 406. The filter circuit 403 subjects the logarithm-transformed data to a filtering process that suits the image area, and then the color correction circuit 404 subjects the filtered data to a color correction that suits the image area so as to generate CMYK data. The color correction circuit 404 supplies the CMYK data to the UCR circuit 405. The UCR circuit 405 subjects the CMYK data to a UCR (undercolor separation) process that suits the image area, and supplies the UCR-processed CMYK data to the dither circuit 406. The dither circuit 406 subjects the UCR-processed CMYK data to a dither process using a dither matrix that suits the image area, and supplies the dither-processed CMYK data to an image output device 414 (an image-forming engine of a laser printer, etc.). The image output device 414 prints out the dither-processed CMYK data.

In the above-described course, the image area separation process is performed by judging a local characteristic of an image. Therefore, accurately speaking, pixels in the vicinity of edges of a black character are judged to be black characters. As to a small-size black character, the black character is consequently judged to be a black character as a whole. However, as to a large-size black character such as in a title, only edge pixels of the black character are judged to be black characters while interior pixels of the character are recognized as photographs. Accordingly, the pixels judged as black characters are converted into monochromatic K data having pixel levels according to the intensity of edges in the color correction and the UCR process so as to be printed solely by an K ink. However, the pixels judged as photographs or dots are converted into four-color CMYK data so as to be printed by overlapping the four-color inks. Accordingly, as illustratively shown in FIG. 12, as to a large-size black character, only edge parts of the black character are reproduced monochromatically by the K color, and interior parts of the character are reproduced by the four CMYK colors. It is noted that a recent color copying machine adjusts density levels of the edge parts and the interior parts so as to prevent the edge parts from appearing unnatural.

When an CMYK image, such as a large-size character as mentioned above, consists of a monochromatic K part and a four-color overlapped part adjacent to each other, converting the CMYK image into RGB data with different contrasts for the monochromatic K part and other parts, as in the color converting device 104 according to the first or third embodiment, may possibly make a resulting image seem unnatural with a black character being fringed, when the RGB data is displayed on the display 103 or is printed out from the color printer 101. On the other hand, subjecting a small-size character to the contrast emphasis yields an increased reproducibility when the small-size character is output from the (other) color printer 101. Hereinbelow, a description will be given of an embodiment of the color converting device 104 devised in consideration of this point.

Fourth Embodiment of the Color Converting Device 104

Figure 13:
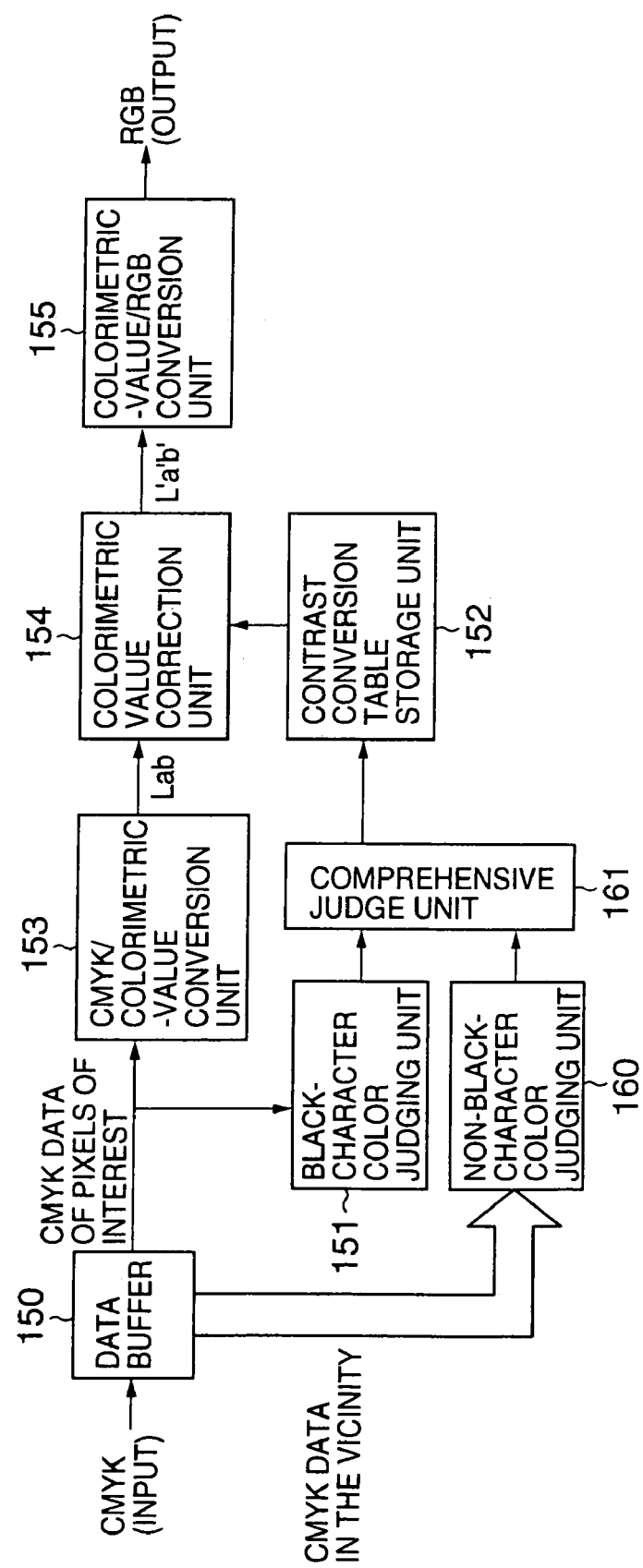
FIG. 13 is a block diagram of a fourth embodiment of the color converting device according to the present invention.

FIG. 13 is a block diagram of a fourth embodiment of the color converting device 104. The color converting device 104 according to the present embodiment is supplied with the CMYK data from, for example, the UCR circuit 405 of the color copying machine via a storage device 415, as shown in FIG. 11. It is noted that the present invention encompasses the color copying machine incorporating the color converting device 104 of the present embodiment internally connected as shown in FIG. 11. Likewise, the present invention also encompasses the image forming device, such as a color printer, incorporating the color converting device 104 of the first, second or third embodiment.

In FIG. 13 in which the elements 150 to 155 are the same elements as shown in FIG. 10, the color converting device 104 further comprises only a non-black-character color judging unit 160 and a comprehensive judge unit 161. The CMYK data (representing each of the colors in 8 bits, for example) supplied from the color copying machine is temporarily stored in the data buffer 150. At the same time when CMYK data of pixels of interest is supplied from the data buffer 150 to the CMYK/colorimetric-value conversion unit 153, CMYK data in the vicinity of the pixels of interest is supplied to the non-black-character color judging unit 160. The non-black-character color judging unit 160 judges whether or not there exists a non-black-character color pixel of a low luminosity in the vicinity of the pixels of interest. For instance, the non-black-character color judging unit 160 examines CMYK data of pixels except the pixels of interest within an 8×8 pixel field centered around the pixels of interest, and when either of chromatic values of C, M, and Y exceeds a predetermined value, the non-black-character color judging unit 160 judges that there exists a non-black-character color pixel of a low luminosity in the vicinity of the pixels of interest. This judgment result and the judgment result of the black-character color judging unit 151 are supplied to the comprehensive judge unit 161. The comprehensive judge unit 161 judges that the pixels of interest represent a black-character color, only when the black-character color judging unit 151 judges that the pixels of interest represent a black-character color, and the non-black-character color judging unit 160 judges that there does not exist a non-black-character color pixel of a low luminosity in the vicinity of the pixels of interest. According to this comprehensive judgment result, the comprehensive judge unit 161 selects the contrast conversion table used for a black-character color stored in the contrast conversion table storage unit 152. In other words, whenever the non-black-character color judging unit 160 judges that there exists a non-black-character color pixel of a low luminosity in the vicinity of the pixels of interest, the colorimetric value correction unit 154 performs a contrast correction using the contrast conversion table used for a non-black-character color. Besides, when the colorimetric value correction unit 154 performs a contrast correction using the contrast conversion table used for a black-character color, the colorimetric value correction unit 154 may forcibly achromatize the colorimetric values L'a'b'. The present invention encompasses the color converting device thus forcibly achromatizing the colorimetric values.

Figure 12:
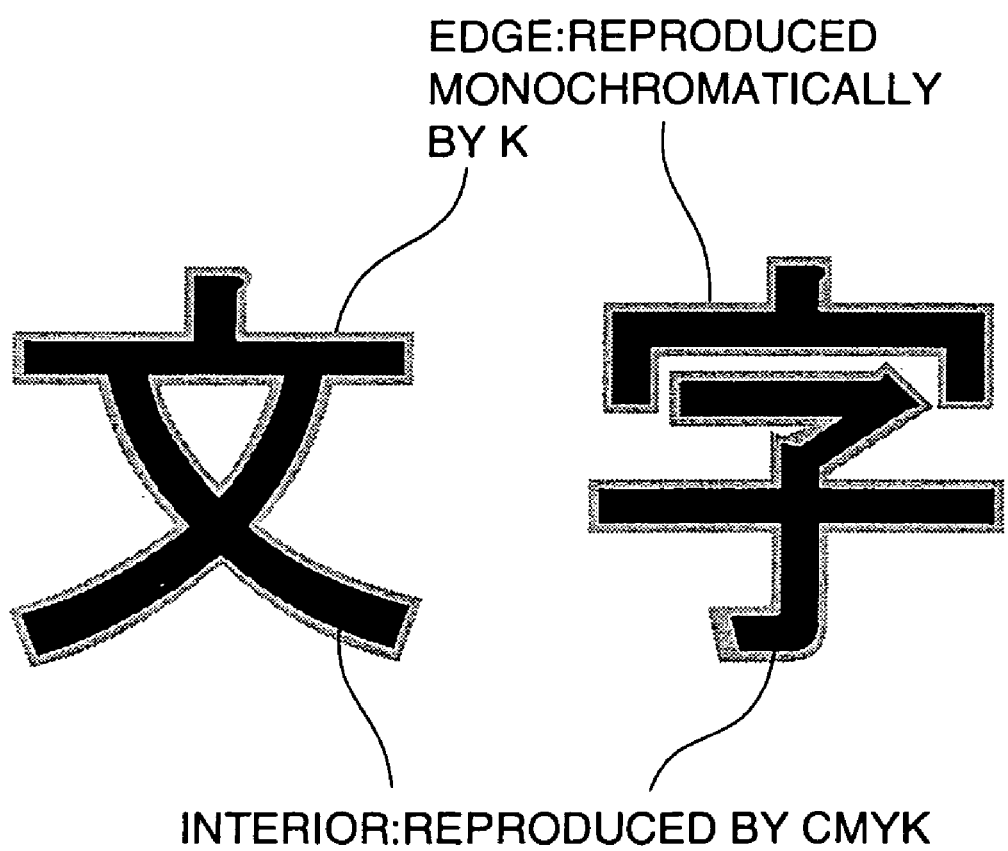
FIG. 12 is an illustration of a large-size character image printed by a color copying machine.

According to the present embodiment, supplying RGB data from the color converting device 104 to the computer 102 so as to display on the display 103 or print out from the color printer 101 can prevent the occurrence of a fringing (a pseudo outlining) of a large-size black character, which is described with reference to FIG. 12, so as to enable a high-quality black-character reproduction.

Additionally, the judgment result of the black-character color judging unit 151 and the judgment result of the non-black-character color judging unit 160 may be supplied directly to the colorimetric value correction unit 154, and the colorimetric value correction unit 154 may select either of the contrast conversion tables according to the judgment results.

Embodiment of the Present Invention Using a Computer

As mentioned above, the present invention can be embodied by means of software in a computer in general or in an image forming device.

For example, loading the color conversion profile (the four-dimensional lookup table) stored in the color conversion profile storage unit 121 shown in FIG. 3 on a memory of a computer or an image forming device, and executing a program including a step corresponding to the grid-point address generation unit 123 and a step corresponding to the interpolative calculation unit 124 can realize a color converting device equivalent to the color converting device 104 having the structure shown in FIG. 3, or the color conversion process thereof. In this case, the program is to further include a step corresponding to the binary/multivalued conversion units 126c, 126m, 126y and 126k, and, if necessary, a step for controlling a buffering using the buffer memories 125c, 125m, 125y and 125k reserved on the memory for that purpose.

Similarly, the color converting device 104 having the structure shown in FIG. 10 or FIG. 13 or the color conversion process thereof can be realized by means of software. This involves loading the contrast conversion table stored in the contrast conversion table storage unit 152 on a memory, and executing a program including steps corresponding to the functional elements (151, 153, 154, 155, 160 and 161) shown in FIG. 10 or FIG. 13, and, if necessary, a step for controlling a buffering using the data buffer 150 reserved on the memory for that purpose.

In addition, the color conversion profile creating device shown in FIG. 4 or the color conversion profile creating process thereof can be realized by means of software. A program therefor includes steps corresponding to the units 300, 303, 304, 305, and 310 shown in FIG. 4, and a step of storing the RGB data converted into by the Lab/RGB converting unit 310 in a four-dimensional lookup table on a memory.

The present invention encompasses the above-described programs. The present invention also embraces various recording mediums, such as a magnetic disk, an optical disk, a magneto-optical disk and a semiconductor memory device, storing the above-described programs.

Although the above-described embodiments use the RGB data as output color data, it is evident from the above descriptions that the present invention is applicable to cases using output color data in another format.

Fifth Embodiment of a Color Converting Device: as a Computer 502

[Configuration of an Image Processing System]

Figure 14:
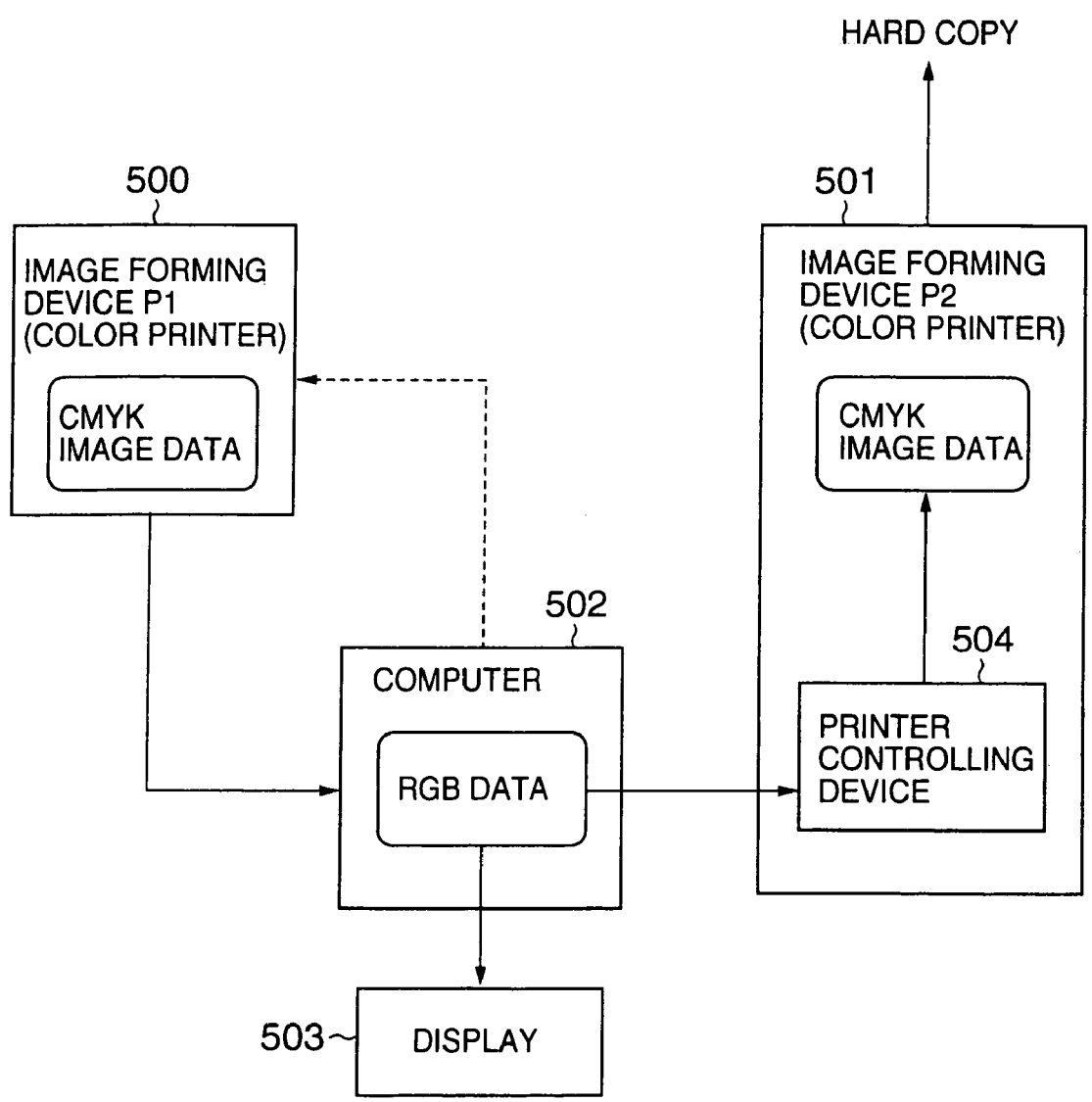
FIG. 14 is a schematic diagram of another embodiment of an image processing system according to the present invention.

FIG. 14 is a schematic diagram of another embodiment of an image processing system according to the present invention. In FIG. 14, the image processing system comprises image forming devices 500 and 501, a computer 502, a display 503, and a printer controlling device 504.

The image forming device 500 (P1) supplies CMYK image data to an external device. Specifically, the image forming device 500 is a color printer, a color copying machine or a color facsimile device comprising a data storage device, such as a hard disk or a RAM.

The computer 502 has functions such as a color converting function for converting the CMYK image data supplied from the image forming device 500 (P1) into RGB image data. Software including various applications and printer drivers can be installed into the computer 502. The computer 502 can display the RGB image data on the display 503. The computer 502 can also cause the RGB image data to be printed by the image forming device 501 (P2) by activating a printer driver corresponding to the image forming device 501 (P2).

The image forming device 501 (P2) receives drawing data from the computer 502, and outputs a hard copy thereof. This image forming device 501 (P2) is a device such as a color printer comprising the printer controlling device 504. The printer controlling device 504 is a processor for converting the drawing data transmitted from the computer 502 into image data to be printed as a hardcopy. The printer controlling device 504 comprises a rendering unit, a band buffer, a color converting unit, a gradating unit, and a page memory, etc.

Besides, although the printer controlling device 504 is described in the present embodiment as being provided in the image forming device 501 (P2), the printer controlling device 504 may be provided as a device independent from the image forming device 501 (P2). Further, part of functions of the printer controlling device 504 may be taken over by the printer driver of the computer 502, etc.

[Operations of the Image Processing System]

Next, a description will be given of operations as a whole of the above-mentioned image processing system shown in FIG. 14. First, the image forming device 500 (P1) stores CMYK image data generated in the course of outputting a hard copy, in the built-in hard disk. An operation of outputting a hard copy means a printing operation using a color printer or a copying operation using a color copying machine, for example. The CMYK image data generated in the image forming device 500 (P1) is transferred to the computer 502 via a network. The computer 502 performs a color conversion converting the transferred CMYK image data into RGB image data, and retains the RGB image data in a storage medium such as a hard disk provided in the computer 502.

An operator of the computer 502 can view the RGB image data by displaying the RGB image data stored in the computer 502 on the display 503 as occasion arises, can process the RGB image data, and can supply the RGB image data to a different image forming device (501) so as to have the RGB data printed.

[Description of a Color Converting Method]

In the above-described image processing system, the computer 502 performs a color converting operation for converting four-dimensional data of a CMYK signal into three-dimensional data, such as an RGB signal. In the present embodiment, the color converting operation for converting the four-dimensional data is performed by utilizing a four-dimensional memory map interpolative calculation.

Then, a description will be given of a principle of a memory map interpolating method according to the present embodiment performed for interpolating four-dimensional data. The four-dimensional memory map interpolative calculation method divides a four-dimensional color space having four axes representing four signals of C, M, Y and K into a plurality of 16-vertex units, and performs an interpolative calculation by using interpolation parameters assigned to a 16-vertex unit to which an input signal belongs.

Here, a specific description will be given of an instance where each of the signals of C, M, Y and K is 8-bit data, and each of the axes is divided into 15 (a four-dimensional color space defined by the four axes is divided into $15^4$ 16-vertex units). Dividing the 8-bit data into 15 makes one step 17 (=255/15). Thereupon, assuming $Tp=T/17$ and $\Delta T=17$ (T is each of color signal values C, M, Y and K; Tp and $\Delta T$ are integral values), the input signal (X), being divided into higher-order data and lower-order data, is represented as (C=17*Cp+$\Delta$C, M=17*Mp+$\Delta$M, Y=17*Yp+$\Delta$Y, K=17*Kp+$\Delta$K).

Coordinates of the vertices (grid points) of a 16-vertex unit surrounding the input signal X are as follows:

[C, M, Y, K]=[17*Cp, 17*Mp, 17*Yp, 17*Kp], [17*Cp, 17*Mp, 17*Yp, 17*(Kp+1)], [17*(Cp+1), 17*Mp, 17*Yp, 17*Kp], [17*(Cp+1), 17*Mp, 17*Yp, 17*(Kp+1)], [17*Cp, 17*(Mp+1), 17*Yp, 17*Kp], [17*Cp, 17*(Mp+1), 17*Yp, 17*(Kp+1)], [17*Cp, 17*Mp, 17*(Yp+1), 17*Kp], [17*Cp, 17*Mp, 17*(Yp+1), 17*(Kp+1)], [17*(Cp+1), 17*(Mp+1), 17*Yp, 17*Kp], [17*(Cp+1), 17*(Mp+1), 17*Yp, 17*(Kp+1)], [17*(Cp+1), 17*Mp, 17*(Yp+1), 17*Kp], [17*(Cp+1), 17*Mp, 17*(Yp+1), 17*(Kp+1)], [17*Cp, 17*(Mp+1), 17*(Yp+1), 17*Kp], [17*Cp, 17*(Mp+1), 17*(Yp+1), 17*(Kp+1)], [17*(Cp+1), 17*(Mp+1), 17*(Yp+1), 17*Kp], [17*(Cp+1), 17*(Mp+1), 17*(Yp+1), 17*(Kp+1)]

Figure 15:
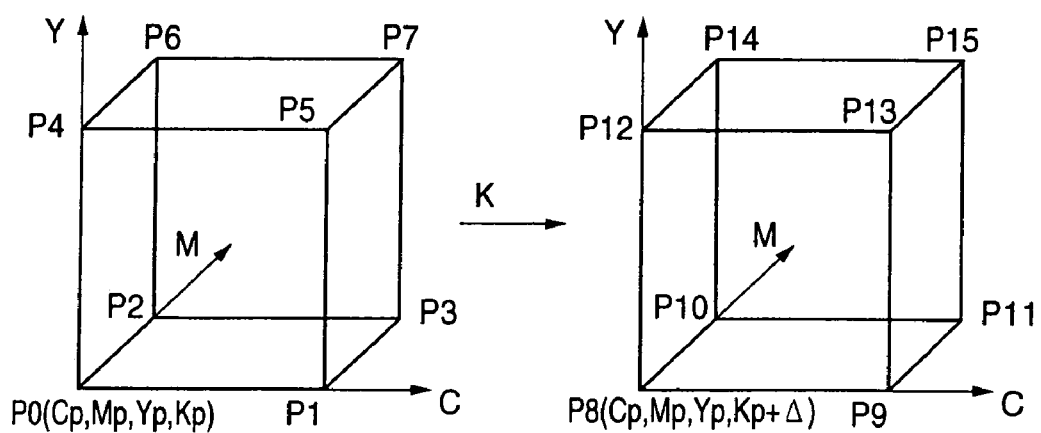
FIG. 15 illustrates a 16-vertex unit.

FIG. 15 shows this 16-vertex unit conveniently divided into two three-dimensional cubes despite its original form of a four-dimensional solid, because the four-dimensional solid is unable to be figured. That is, the left cube is an interpolation unit of C-M-Y with the value K being fixed at Kp×$\Delta$, and the right cube is an interpolation unit of C-M-Y with the grid point of K being fixed at (Kp+1)×$\Delta$ ($\Delta$ is a grid size of the interpolation unit; $\Delta$=17 when the 8-bit data is divided into 15).

Figures 16, 17:
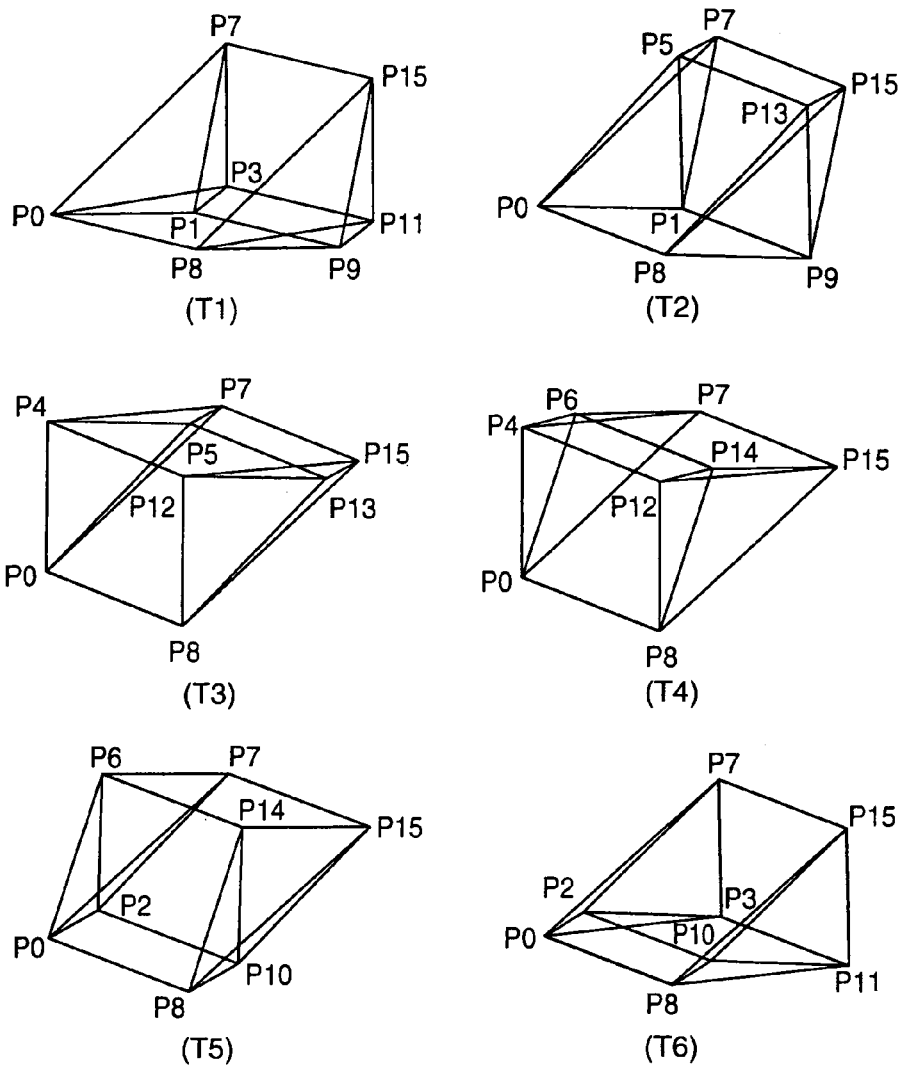
FIG. 16 illustrates six 8-vertex solids.
FIG. 17 shows expressions used in selecting an 8-vertex solid.

One of publicly known methods for interpolating this 16-vertex unit is a five-point interpolation method which divides the 16-vertex unit into 24 five-vertex solids so as to perform a five-point interpolative calculation. However, since there are as many as 24 patterns of selecting five points, determining a five-vertex solid requires a complicated judgment. Thereupon, the present embodiment divides the 16-vertex unit into six 8-vertex solids (T1 to T6) as shown in FIG. 16 so as to adopt an eight-point interpolative calculation.

First, a 16-vertex unit is selected from a plurality of the 16-vertex units according to the higher-order data of the input color signals. Next, in the eight-point interpolative calculation, the lower-order data ΔC, ΔM and ΔY of the input color signals C, M and Y are compared with each other in terms of values (magnitude relation: large or small) so as to determine (select) an 8-vertex solid from among the six 8-vertex solids. FIG. 17 shows expressions used in this comparison.

Figures 18, 19:
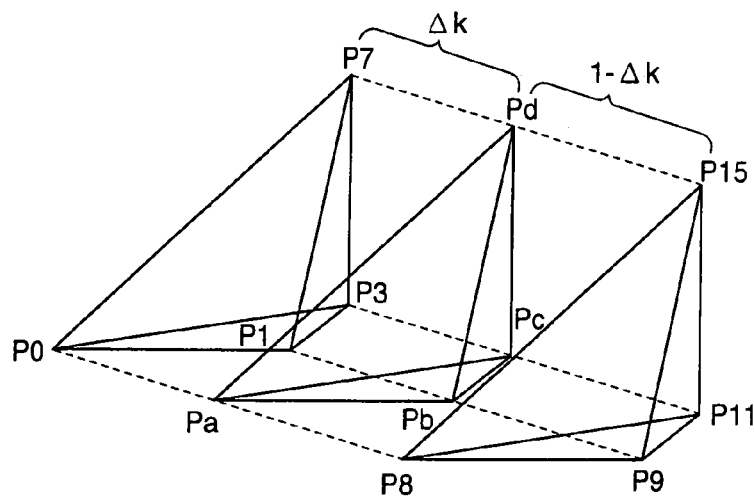
FIG. 18 is an illustration used to explain an interpolative calculation method according to the present invention.
FIG. 19 shows correspondences between the 8-vertex solids and coefficients $\alpha$, $\beta$, $\gamma$ and $\delta$.

Subsequently, an interpolative calculation process is performed by using the 8-vertex solid selected in the 8-vertex solid determining process described above. Here, a description will be given, with reference to FIG. 18, of an interpolative calculation method, in a case where the 8-vertex solid T1 is selected. FIG. 18 shows the selected 8-vertex solid T1. First, in the interpolative calculation method according to the present embodiment, two corresponding vertices of the 8-vertex solid are linearly interpolated so as to form a tetrahedron. In the example shown in FIG. 18, Pa, Pb, Pc and Pd are calculated as follows.

$Pa=P0+(P8-P0)\times \Delta k$ (Expression 1-a)

$Pb=P1+(P9-P1)\times \Delta k$ (Expression 1-b)

$Pc=P3+(P11-P3)\times \Delta k$ (Expression 1-c)

$Pd=P7+(P15-P7)\times \Delta k$ (Expression 1-d)

In these expressions, Δk is expressed as Δk=Δ K/Δ (0≦Δk≦1.0), and Pi means an output value assigned to each vertex. Thus, interpolating the corresponding two vertices linearly by using the lower-order data of the color signal K can replace a four-dimensional interpolative calculation with a three-dimensional tetrahedral interpolative calculation.

After the formation of the tetrahedrons, an output value P can be calculated in the same manner as in a normal tetrahedral interpolative calculation with a three-dimensional space, as follows.

$P = \alpha \Delta C/\Delta + \beta \Delta M/\Delta + \gamma \Delta Y/\Delta + \delta$ (Expression 2-a)

$= (Pb-Pa)\Delta C/\Delta + (Pc-Pb)\Delta M/\Delta +$
$(Pd-Pc)\Delta Y/\Delta + Pa$ (Expression 2-b)

In cases where the 8-vertex solids T2 to T6 are selected, basically the same interpolative calculation method is performed. FIG. 19 shows correspondences between the 8-vertex solids T1 to T6 and the coefficients α, β, γ and δ used in the expressions above. In FIG. 19, P(i,j) represents a value obtained by linearly interpolating output values assigned to vertices Pi and Pj by Δk.

In the present embodiment, the four-dimensional interpolative calculation is performed by the expressions above. Besides, although FIG. 15 shows the 16-vertex unit (an interpolation object space) divided into the two cubes, the interpolation object space of the present invention is not limited thereto; the present invention is applicable to a 16-vertex solid having edges different in length, and to a transformational 16-vertex solid corresponding to an input signal represented by polar coordinates, etc.

[Description of a Color Converting Device]

Figure 20:
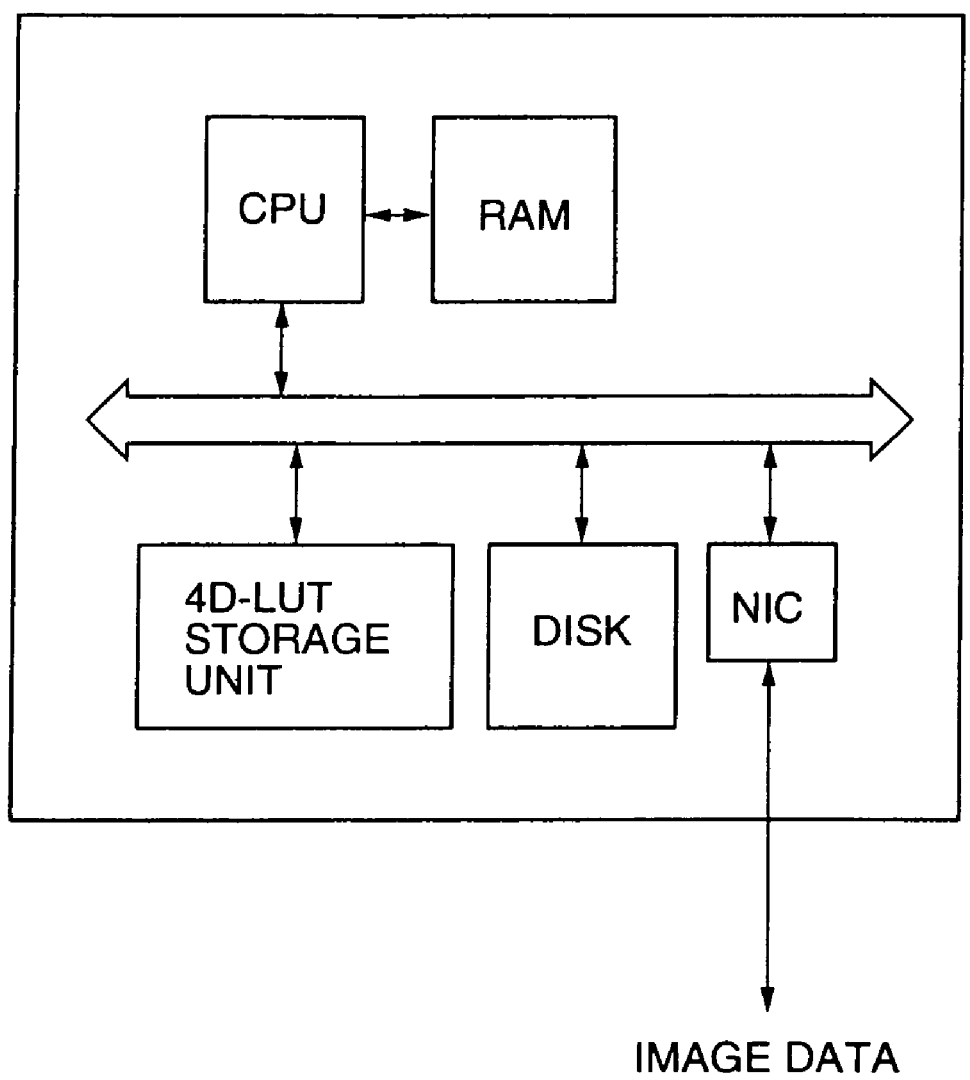
FIG. 20 is a block diagram of an example of a computer performing a color converting operation.

Hereinbelow, a description will be given of a specific example of a color converting device realizing the above-described color converting method. In the image processing system shown in FIG. 14, the computer 502 controls the system so as to convert CMYK image data transmitted from the image forming device 500 (P1) into RGB image data. FIG. 20 is a block diagram of an example of the computer 502 performing the color converting operation. The computer 502 comprises a network interface card (NIC) communicating data with an external device, a disk (DISK) temporarily storing image data transmitted from the NIC, a four-dimensional lookup table (4D-LUT) storage unit (storing means), a central processing unit (CPU: determining means, reading means, generating means, interpolating means) performing a color converting process, and a random access memory (RAM).

First, when image data is transmitted to the computer 502 via the NIC, the image data is temporarily retained in the DISK. Next, the CPU retrieves the image data from the DISK, and stores the image data in the RAM. Then, the CPU performs a color converting process while accessing the RAM. To perform the color converting process, the CPU reads the image data, pixel by pixel, from the RAM, and evaluates CMYK values of the read pixel so as to determine a read address in the 4D-LUT storage unit. Then, after reading therefrom interpolation parameters necessary for an interpolative calculation, the CPU performs a color conversion converting the pixel data into such a signal as an RGB signal. The CPU performs such color conversions while successively reading pixel data from the RAM, and retains the conversion results (such as the RGB signals) in the DISK. Upon completion of the color conversions for all the CMYK image data retained in the DISK, the image data is transferred to an external device via the NIC.

Figure 21:
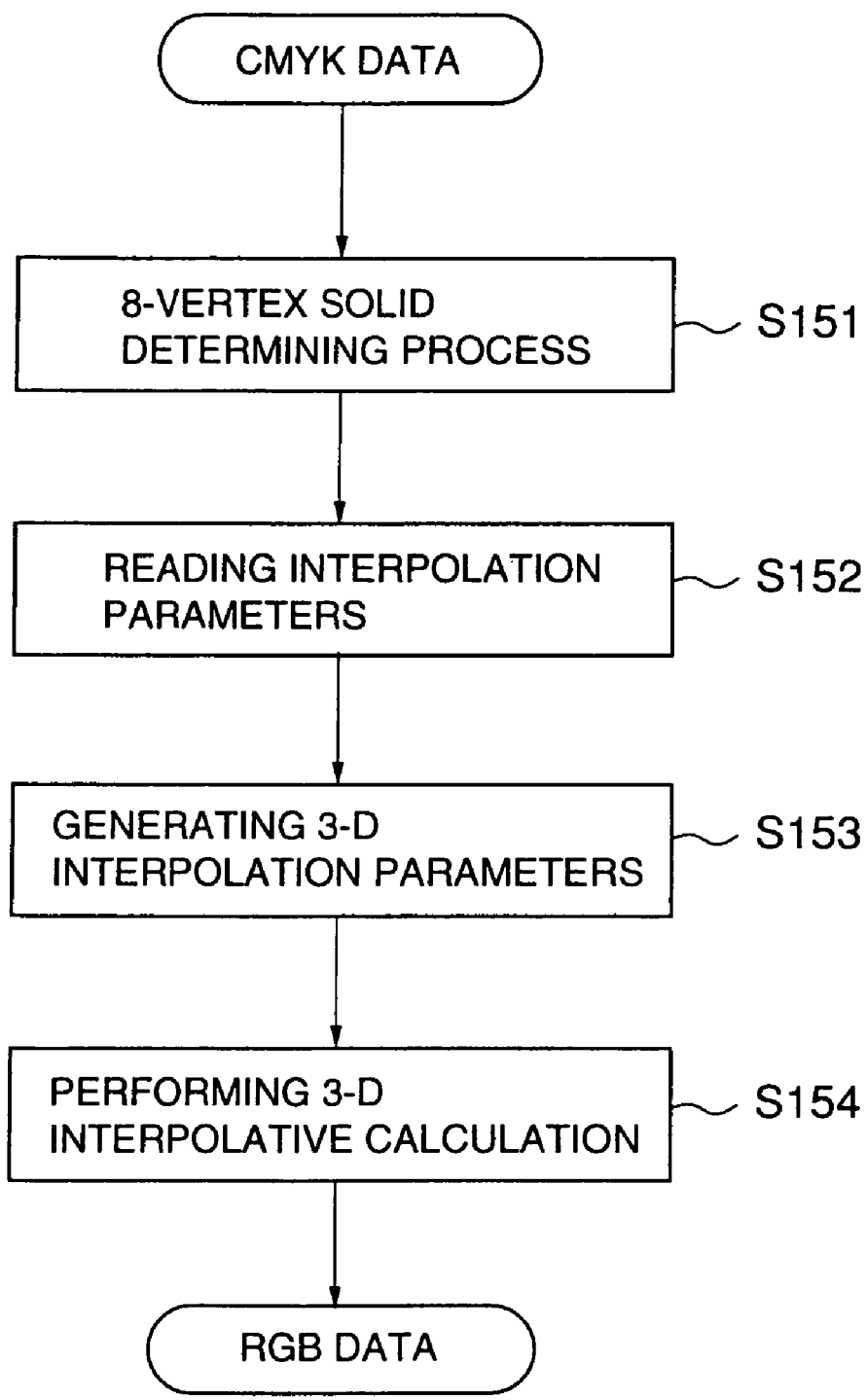
FIG. 21 is a flowchart of an interpolative calculation process.
Figure 22:
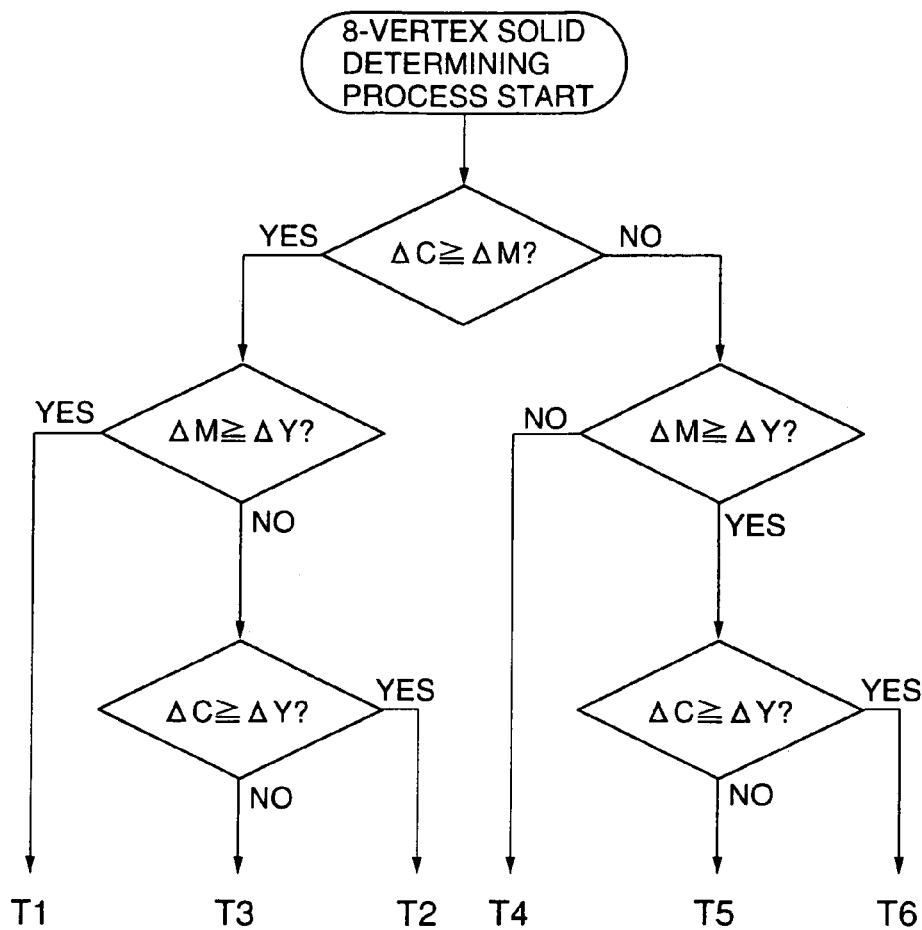
FIG. 22 is a flowchart of an 8-vertex solid judging (determining) process.

A description will be given, with reference to FIG. 21, of the color converting operation performed by the CPU. FIG. 21 is a flowchart of the color converting operation (the interpolative calculation process). First, in step S151 (determining means; determining step), it is judged (determined) which of the 8-vertex solids corresponds to input image data. FIG. 22 is a flowchart of this 8-vertex solid judging (determining) process. As shown in FIG. 22, in the present invention, a judging process imposing a heavy load on a CPU is performed only with the lower-order data (ΔC, ΔM and ΔY) of the three input signals C, M and Y, and thus can be performed only with three steps at the maximum as shown in FIG. 22.

After the 8-vertex solid is determined, interpolation parameters are read from the 4D-LUT storage unit, in step S152 (reading means). This color converting operation (the interpolative calculation process) requires the parameters shown in FIG. 19. The addressing of the 4D-LUT storage unit is performed according to the higher-order data Cp, Mp, Yp and Kp of the input signals C, M, Y and K, and to the determination result of the 8-vertex solid, as described in detail later herein. After the parameters corresponding to the 8 vertices are read, P(i,j) is calculated, in step S153 (generating means; generating step). Then, in step S154 (interpolating means; interpolating step), the three-dimensional interpolative calculation is performed so as to calculate a value of the output RGB signal.

[Method of Reading Parameters from the 4D-LUT Storage Unit]

A description will be given of a method of reading the interpolation parameters from the 4D-LUT storage unit. The 4D-LUT storage unit stores output values corresponding to four-dimensional divisional grid points. For example, when each of input CMYK data of C, M, Y and K is divided into 15, the 4D-LUT storage unit successively stores the following output values corresponding to the CMYK data.

[C,M,Y,K]=[0,0,0,0], [0,0,0,15], [0,0,0,30], . . . [0,0,0, 255], [0,0,15,0], [0,0,15,15], [0,0,15,30], . . . [0,0,15, 255], . . . , . . . , [255,255,255,0], [255,255,255,15], [255, 255,255,30], . . . [255,255,255,255]

When the 4D-LUT storage (memory) unit stores the parameters in this order, parameters of [C,M,Y,K]=[c,m,y,k] and [c,m,y,k+Δ] are always located at serial addresses. Thus, since the 4D-LUT storage unit serially stores parameters necessary for performing the linear interpolative calculations represented by the expressions 1, the CPU can retrieve two parameters simultaneously by one memory access. Accordingly, the CPU can read the parameters at high speed.

For example, when the CPU reads color conversion parameters used in relation to the above-mentioned 8-vertex solid T1, the CPU can retrieve two bytes at the same time because P1 and P9 are serially located. Similarly, the CPU can simultaneously retrieve P0 and P8, P3 and P11, and P7 and P15, respectively. Accordingly, the CPU needs to access the 4D-LUT storage unit only four times.

As described above, in the present embodiment, the simple 8-vertex solid judging (determining) process and the fast memory access enable the color conversion appropriate for a CPU processing.

Further, each of the expressions 1 calculates a sum of products. Some of recent CPUs are capable of performing such a sum-of-products calculation in one clock, or capable of calculating a plurality of sum-of-products calculations in parallel. In consideration of this trend, performing the sum-of-products calculations represented by the expressions 1 does not cause a problem in terms of a processing rate. However, in case the CPU is inapt to performing the sum-of-products calculation, the load of the sum-of-products calculations offsets the advantage of the above-described simple judging (determining) process.

Thereupon, in case the CPU is incapable of accelerating the sum-of-products calculation, the multiplication terms in the expression 1 may be replaced with memory lookup operations. For example, as to the expression 1-a, retaining a correspondence of the differential value (P8–P0) and Δk with a multiplication result thereof in a static memory enables the memory lookup operation to replace the multiplication.

Since ΔK is the lower-order data of the K signal, ΔK only assumes values in a limited range. For example, when each of the input CMYK data is divided into 15, ΔK only assumes 17 patterns of values. Additionally, the differential value (P8–P0) does not claim more than 8 bits. Accordingly, the above-mentioned multiplication only requires a multiplication memory of a size as small as 4.25 Kbytes (=256 bytes×17), which does not impose a load on the CPU processing. In addition, the same multiplication memory can be used in performing the expressions 2. In this case, multiplications in the interpolative calculation are not necessary. Therefore, performing the 8-vertex solid judging (determining) process at high speed in the CPU processing can enhance the performance of the interpolative calculation as a whole.

Sixth Embodiment of a Color Converting Device

In the above-described fifth embodiment, the 16-vertex unit is divided into the six 8-vertex solids so as to perform the three-dimensional tetrahedral interpolative calculation by utilizing the linear interpolative calculations. In the present sixth embodiment, based on the same concept, the 16-vertex unit is divided into the two 12-vertex solids.

Figure 23:
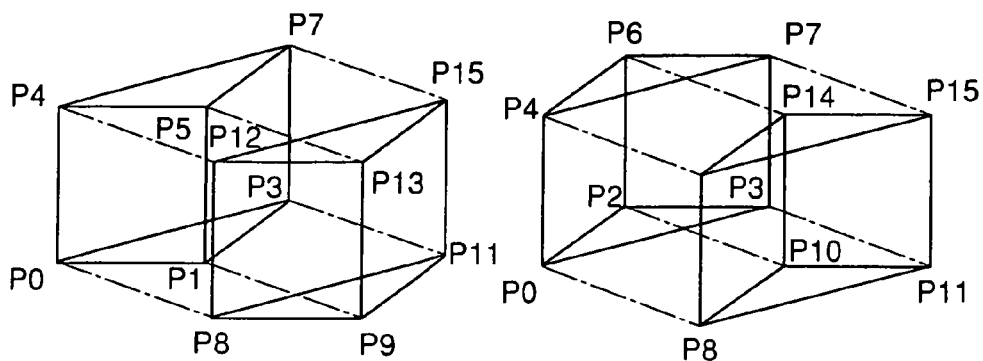
FIG. 23 illustrates two 12-vertex solids.

FIG. 23 illustrates the two 12-vertex solids divided from the 16-vertex unit. In FIG. 23, each of the two 12-vertex solids is divided into triangular prisms. In this case, a 12-vertex solid judging (determining) process needs to be performed only once because only two of the lower-order data ΔC, ΔM, ΔY and ΔK of the four signals C, M and Y are compared with each other, unlike the 8-vertex solid judging (determining) process.

An interpolative calculation for the 12-vertex solid is similar to the interpolative calculation for the 8-vertex solid described above in the fifth embodiment. That is, two corresponding vertices of the 12-vertex solid are linearly interpolated by the lower-order data of the K signal so as to form a three-dimensional triangular prism, and thereafter, a normal triangular-prism interpolative calculation is performed.

Seventh Embodiment of a Color Converting Device

Figure 24:
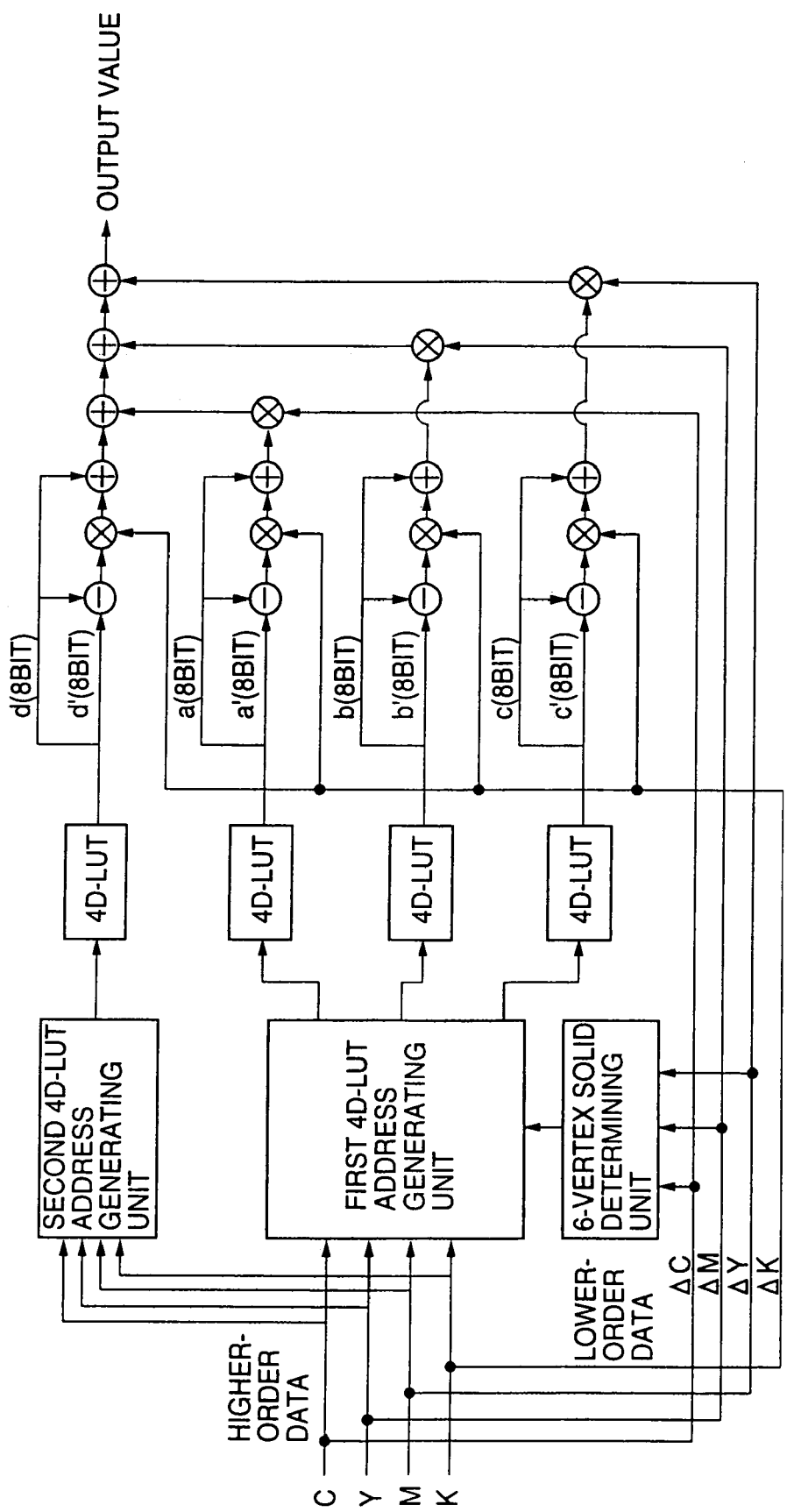
FIG. 24 is a block diagram of an example of the present invention realized by means of hardware.

Whereas the above-described fifth and sixth embodiments are realized as the processes of the CPU, the present embodiment can be realized by means of hardware. FIG. 24 is a block diagram of an example of the present invention realized by means of hardware. In the present embodiment, the expression 2-b is transformed so as to simplify a circuit.

That is, in the expression 2-b (P=(Pb–Pa)ΔC/Δ+(Pc–Pb)ΔM/Δ+(Pd–Pc)ΔY/Δ+Pa), (Pb–Pa) can be transformed as follows, by using the expressions 1.

$$Pb-Pa=P1+(P9-P1)\times \Delta k-P0-(P8-P0)\times \Delta k$$

$$=P1-P0+(P9-P1-P8+P0)\times \Delta k$$

$$=(P1-P0)+((P9-P8)-(P1-P0))\Delta k$$

At this point, assuming a=P1–P0 and a'=P9–P8 and storing (a) and (a') in a 4D-LUT enables an interpolative calculation to be performed by multiplying each of ΔC, ΔM and ΔY by a simple sum of products, as shown in FIG. 24.

Similarly, in the expression 2-b, (Pc–Pb), (Pd–Pc) and Pa can be transformed as follows, by using the expressions 1.

$$Pc-Pb=(P3-P1)+((P11-P9)-(P3-P1))\Delta k$$

$$Pd-Pc=(P7-P3)+((P15-P11)-(P7-P3))\Delta k$$

$$Pa=P0+(P8-P0)\times \Delta k$$

Accordingly, the expression 2-b is generalized as follows.

$$P=((a'-a)\Delta K+a)\Delta C+((b'-b)\Delta K+b)\Delta M+((c'-c)\Delta K+c)\Delta Y+(d'-d)\Delta K+d$$

Since a, a', b, b', c and c' have different values for each of 6-vertex solids, the values of a, a', b, b', c and c' are switched by a first 4D-LUT address generating unit controlling memory addresses in the 4D-LUTs by according to a result of a 6-vertex solid judging (determining) process performed by a 6-vertex solid judging (determining) unit. However, since d and d' are common parameters for all of the six vertices, addresses of d and d' in the 4D-LUT are determined by a second 4D-LUT address generating unit according only to the higher-order data of the signals C, M, Y and K without using the result of the 6-vertex solid judging (determining) process, as shown in FIG. 24.

Eighth Embodiment of a Color Converting Device

In the above-described fifth to seventh embodiments, CMYK data is converted into RGB data. However, the present invention is not limited thereto. For example, the present invention is also applicable to a color conversion of multiband data that is being put into use in the field of telemedicine.

In general, objects existent in the natural world have various characteristics of spectral reflectance. Therefore, there occurs a metamerism in which two objects appearing to be the same color in a certain lighting environment assume different colors in a different lighting environment. When such metamerism occurs when performing telemedicine, a doctor cannot recognize physical conditions of a patient, such as the color of the skin, which hampers a proper medical treatment. Thus, for the purpose of reproducing the same color in different lighting environments at the doctor side and the patient side, multiband data is being put into use in the field of telemedicine.

With this multiband data, a spectral distribution of an object is represented through a multitude of filters having different characteristics of spectral transmittance. Therefore, a color of an object is represented by, normally, a color signal having 10 components or more. Such multidimensional data needs ultimately to be converted into three-dimensional data so as to be displayed on a monitor screen, which necessitates a color converting means for converting multidimensional an input color signal into such a signal as a three-dimensional color signal.

The color converting device according to the present invention is usable also in converting n-dimensional data into m-dimensional data having fewer dimensions than the n-dimensional data.

Figure 25:
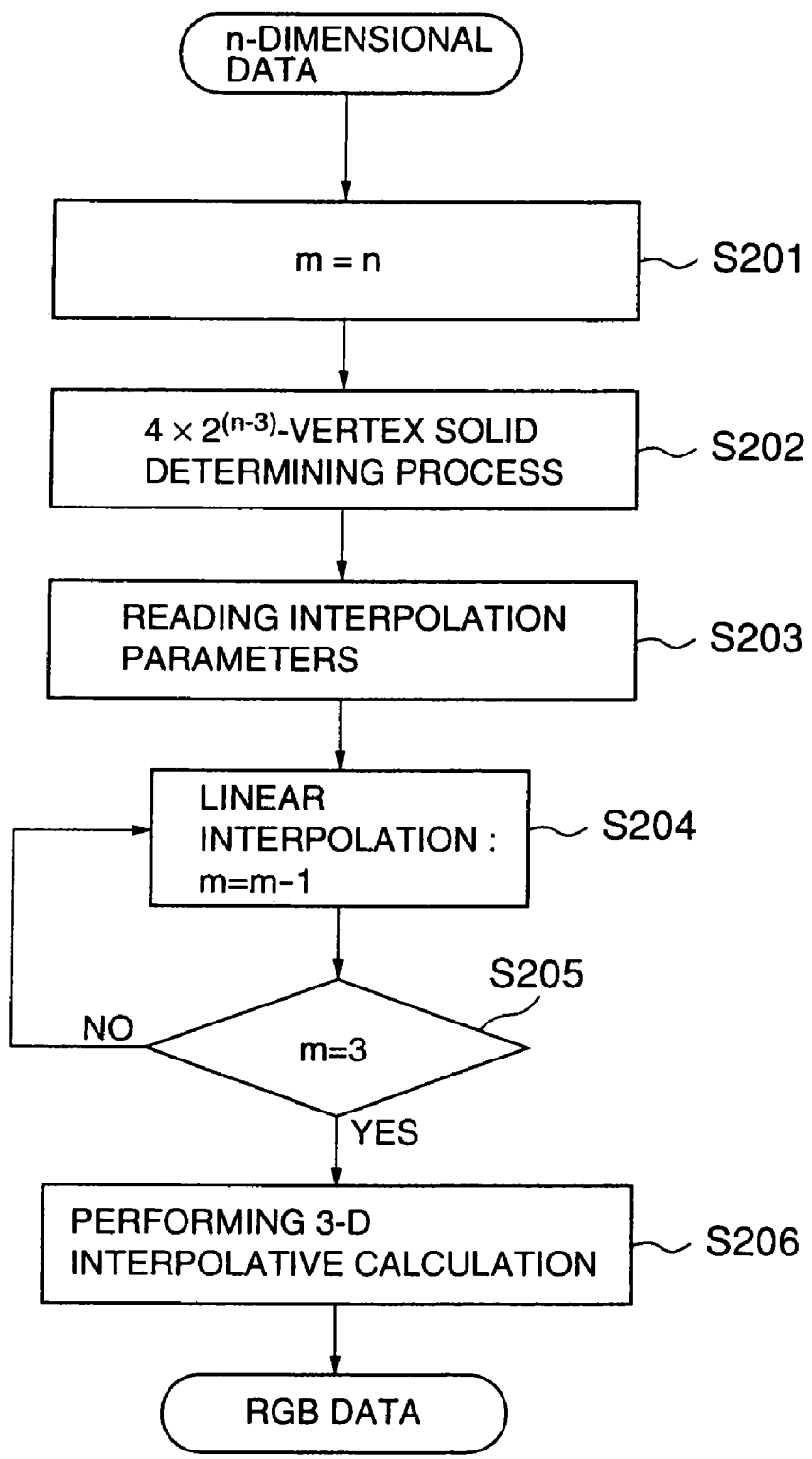
FIG. 25 is a flowchart of a color converting operation according to another embodiment of the present invention.

A description will be given of a specific method of converting the n-dimensional data into the m-dimensional data. The n-dimensional data can be converted into (n−1)-dimensional data by performing the linear interpolations represented by the expressions 1. Successively, repeating these linear interpolations reduces the number of dimensions so as to transform an n-dimensional interpolative calculation into an m-dimensional interpolative calculation. FIG. 25 is a flowchart of a color converting operation according to the present eighth embodiment. Initially in step S201, the number of dimensions (m) is equal to the number of dimensions (n). In step S202 (determining means; determining step), it is judged (determined) which of vertex solids corresponds to input image data, as in the step s151 shown in FIG. 21 of the fifth embodiment. When using a tetrahedral interpolation as a three-dimensional interpolative calculation, the number of vertex solids of the n-dimensional data becomes $4 \times 2^{(n-3)}$. (When using a triangular-prism interpolation, the number of vertex solids of the n-dimensional data becomes $6 \times 2^{(n-3)}$.) Then, in step S203 (reading means), interpolation parameters corresponding to vertices of the selected vertex solid are read. Next, in step S204 (generating means; generating step), corresponding two vertices are linearly interpolated. This linear interpolation process halves the number of vertices, and reduces the number of dimensions (m) by one. The linear interpolation process in the step S204 is repeated until the number of dimensions (m) equals 3 (Yes in step S205). Subsequently, in step S206 (interpolating means; interpolating step), a three-dimensional interpolative calculation, such as a tetrahedral interpolation or a triangular-prism interpolation, is performed so as to calculate an output value.

[Description of a Recording Medium]

Figure 26:
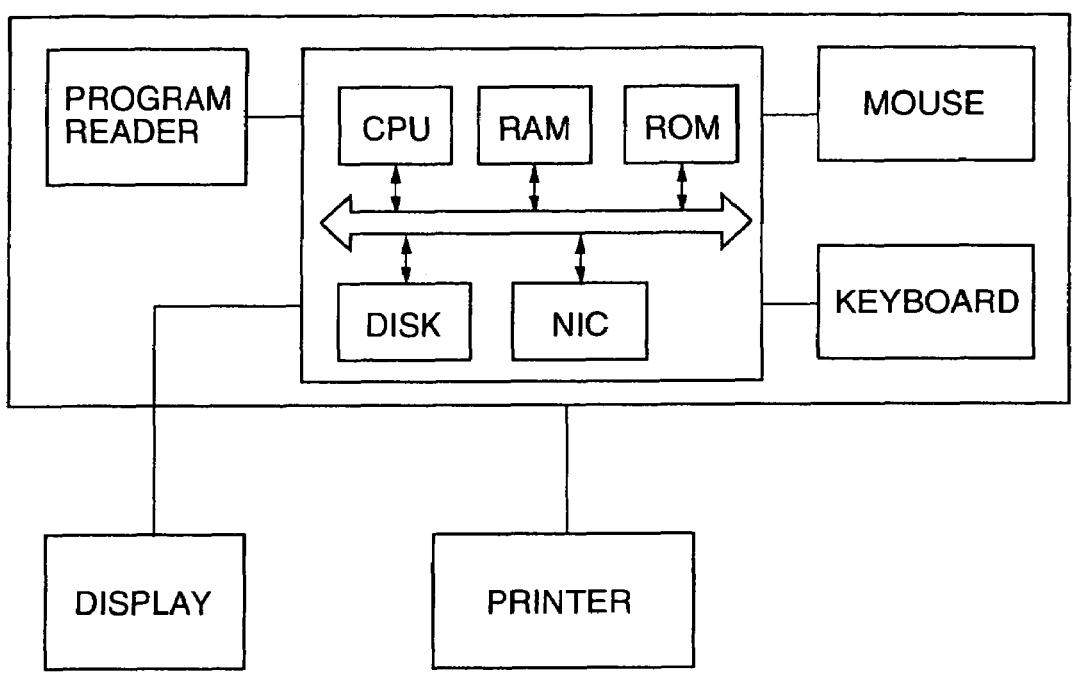
FIG. 26 exemplifies a hardware configuration of an image processing system in which the present invention is realized by means of software recorded on a recording medium.

FIG. 26 exemplifies a hardware configuration of an image processing system in which the computer 502 reads a program recorded on a recording medium, and executes the program so as to perform the above-described color converting process. As shown in FIG. 26, this image processing system is realized by such a device as a workstation or a personal computer. The image processing system comprises a CPU controlling the entire system, a ROM storing firmware such as control programs for the CPU, a RAM serving such usage as a work area for the CPU, a hard disk, a mouse, a keyboard, a network interface card (NIC), a display for displaying image data, and an image forming device such as a color printer.

In the above-described configuration, the CPU, the ROM, the RAM and the hard disk together function also as the computer 502 shown in FIG. 14, in which the CPU can have a function as the color converting device according to the present invention. Besides, the CPU can be provided with this function in the form of, for example, a software package, specifically in the form of an information recording medium, such as a CD-ROM. Therefore, the image processing system shown in FIG. 26 includes a medium driver (a program reader) driving such an information recording medium.

In other words, the color converting device and the color converting method according to the present invention can be realized in a configuration in which a program recorded on an information recording medium, such as a CD-ROM, is installed into a general purpose computing system comprising an image scanner and a display so that a microprocessor of this image processing device performs the color converting process and the color conversion profile creating process. In this case, the program used to perform the color converting process according to the present invention, i.e., the program used in a hardware system, is provided as being recorded on the information recording medium. Not only a CD-ROM but also other mediums, such as a ROM, a RAM, a flexible disk, and a memory card can be used as the information recording medium recording the program and other software. The program recorded on the information recording medium is installed into a storage device, such as a hard disk, incorporated in the hardware system, and is executed so as to realize the color converting function.

In addition, the program used to realize the color converting device and the color converting method according to the present invention is provided not only in the form of a recording medium, but also by means of communication from a server.

The present invention is not limited to the specifically disclosed embodiments, and variations and modifications may be made without departing from the scope of the present invention.

The present application is based on Japanese priority applications No. 2001-031864 filed on Feb. 8, 2001 and No. 2001-252950 filed on Aug. 23, 2001, the entire contents of which are hereby incorporated by reference.

What is claimed is:

1. A computer readable recording medium staring program code for causing a computer to convert CMYK data into output color data in a predetermined different format, the recording medium comprising:

color conversion profile referring program code means for referring to a color conversion profile so as to convert the CMYK data into the output color data, the color conversion profile being created by a color conversion profile creating device including:
- a CMYK data generation unit generating the CMYK data;
- a colorimetric value converting unit converting said CMYK data generated by said CMYK data generation unit into a colorimetric value to be measured with respect to an image formed from said CMYK data by an image forming device;
- a black-character color judging unit judging whether or not said CMYK data generated by said CMYK data generation unit represents a black-character color;
- a colorimetric value correcting unit correcting said colorimetric value by performing a contrast correction appropriate for a black-character color to the colorimetric value converted by said colorimetric value converting unit from the CMYK data judged to represent the black-character color by said black-character color judging unit, and by performing a contrast correction appropriate for a non-black-character color to the colorimetric value converted by said colorimetric value converting unit from the CMYK data judged to represent the non-black-character color by said black-character color judging unit; and
- a color conversion profile setting unit setting said color conversion profile by using said colorimetric value corrected by said colorimetric value correcting unit,
- wherein said color conversion profile has a characteristic of emphasizing a contrast of the output color data corresponding to the CMYK data representing the black-character color more than a contrast of the output color data corresponding to the CMYK data representing the non-black-character color.

2. A computer readable recording medium storing program code for causing a computer to convert CMYK data into output color data in a predetermined different format, the recording medium comprising:
- color conversion profile referring program code means for referring to a color conversion profile so as to convert the CMYK data into the output color data, the color conversion profile being created by a color conversion profile creating method including:
- the CMYK data generating step of generating the CMYK data;
- the colorimetric value converting step of converting said CMYK data generated by said CMYK data generating step into a colorimetric value to be measured with respect to an image formed from said CMYK data by an image forming device;
- the black-character color judging step of judging whether or not said CMYK data generated by said CMYK data generating step represents a black-character color; the colorimetric value correcting step of correcting said colorimetric value by performing a contrast correction appropriate for a black-character color to the colorimetric value converted by said colorimetric value converting step from the CMYK data judged to represent the black-character color by said black-character color judging step, and by performing a contrast correction appropriate for a non-black-character color to the colorimetric value converted by said colorimetric value converting step from the CMYK data judged to represent the non-black-character color by said black-character color judging step; and
- the color conversion profile setting step of setting said color conversion profile by using said colorimetric value corrected by said colorimetric value correcting step,
- wherein said color conversion profile has a characteristic of emphasizing a contrast of the output color data corresponding to the CMYK data representing the black-character color more than a contrast of the output color data corresponding to the CMYK data representing the non-black-character color.

3. A color converting device converting input CMYK data into output color data in a predetermined different format, the device comprising:
- a CMYK/colorimetric-value conversion unit converting the CMYK data into a colorimetric value;
- a black-character color judging unit judging whether or not the CMYK data represents a black-character color;
- a colorimetric value correction unit correcting said colorimetric value by performing a contrast correction appropriate for a black-character color to the colorimetric value converted by said CMYK/colorimetric-value conversion unit from the CMYK data judged to represent the black-character color by said black-character color judging unit, and by performing a contrast correction appropriate for a non-black-character color to the colorimetric value converted by said CMYK/colorimetric-value conversion unit from the CMYK data judged to represent the non-black-character color by said black-character color judging unit; and
- a colorimetric-value/output-color-data conversion unit converting said colorimetric value corrected by said colorimetric value correction unit into the output color data,
- wherein a contrast of the output color data corresponding to the CMYK data judged to represent the black-character color is emphasized more than a contrast of the output color data corresponding to the CMYK data judged to represent the non-black-character color.

4. The color converting device as claimed in claim 3, wherein said colorimetric value correction unit performs the contrast correction by linearly transforming a dynamic range of a luminous component of the colorimetric value determined appropriate for each of the black-character color and the non-black-character color into a predetermined dynamic range.

5. The color converting device as claimed in claim 3, wherein said colorimetric value correction unit performs the contrast correction appropriate for the black-character color to said colorimetric value converted from said CMYK data judged to represent the black-character color by linearly transforming a dynamic range of a luminous component of said colorimetric value determined appropriately for the black-character color into a predetermined dynamic range, and performs the contrast correction appropriate for the non-black-character color to said colorimetric value converted from said CMYK data judged to represent the non-black-character color by linearly transforming a dynamic range of a luminous component of said colorimetric value determined appropriately for the non-black-character color into a predetermined dynamic range.

6. The color converting device as claimed in claim 3, wherein said colorimetric value correction unit corrects said colorimetric value converted from said CMYK data judged to represent the black-character color so that a chroma of said colorimetric value becomes zero.

7. The color converting device as claimed in claim 3, further comprising a non-black-character color judging unit judges from the CMYK data in a vicinity of a pixel of interest whether or not there exists a pixel of the non-black-character color having a luminosity lower than a predetermined luminosity in the vicinity of said pixel of interest, wherein said colorimetric value correction unit performs said contrast correction appropriate for the non-black-character color with respect to said pixel of interest when said non-black-character color judging unit judges that there exists the pixel of the non-black-character color having the luminosity lower than the predetermined luminosity in the vicinity of said pixel of interest.

8. A color conversion profile creating device creating a color conversion profile used for converting CMYK data into output color data in a predetermined different format, the device comprising:

a CMYK data generation unit generating the CMYK data;

a colorimetric value converting unit converting said CMYK data generated by said CMYK data generation unit into a colorimetric value to be measured with respect to an image formed from said CMYK data by an image forming device;

a black-character color judging unit judging whether or not said CMYK data generated by said CMYK data generation unit represents a black-character color;

a colorimetric value correcting unit correcting said colorimetric value by performing a contrast correction appropriate for a black-character color to the colorimetric value converted by said colorimetric value converting unit from the CMYK data judged to represent the black-character color by said black-character color judging unit, and by performing a contrast correction appropriate for a non-black-character color to the colorimetric value converted by said colorimetric value converting unit from the CMYK data judged to represent the non-black-character color by said black-character color judging unit; and a color conversion profile setting unit setting said color conversion profile by using said colorimetric value corrected by said colorimetric value correcting unit, wherein said color conversion profile has a characteristic of emphasizing a contrast of the output color data corresponding to the CMYK data representing the black-character color more than a contrast of the output color data corresponding to the CMYK data representing the non-black-character color.

9. The color conversion profile creating device as claimed in claim 8, wherein said colorimetric value correcting unit performs the contrast correction by linearly transforming a dynamic range of a luminous component of the colorimetric value determined appropriate for each of the black-character color and the non-black-character color into a predetermined dynamic range.

10. The color conversion profile creating device as claimed in claim 8, wherein said colorimetric value correcting unit performs the contrast correction appropriate for the black-character color to said colorimetric value converted from said CMYK data judged to represent the black-character color by linearly transforming a dynamic range of a luminous component of said colorimetric value determined appropriately for the black-character color into a predetermined dynamic range, and performs the contrast correction appropriate for the non-black-character color to said colorimetric value converted from said CMYK data judged to represent the non-black-character color by linearly transforming a dynamic range of a luminous component of said colorimetric value determined appropriately for the non-black-character color into a predetermined dynamic range.

11. The color conversion profile creating device as claimed in claim 8, wherein said colorimetric value correcting unit corrects said colorimetric value converted from said CMYK data judged to represent the black-character color so that a chroma of said colorimetric value becomes zero.

12. The color conversion profile creating device as claimed in claim 8, wherein said CMYK data generation unit generates the CMYK data corresponding to a plurality of representative points in a four-dimensional color space defined by four components of CMYK, and said color conversion profile setting unit creates a four-dimensional lookup table as said color conversion profile, the four-dimensional lookup table representing correspondences of said representative points with respective values of the output color data.

13. A color conversion profile creating method creating a color conversion profile used for converting CMYK data into output color data in a predetermined different format, the method comprising:

the CMYK data generating step of generating the CMYK data;

the colorimetric value converting step of converting said CMYK data generated by said CMYK data generating step into a colorimetric value to be measured with respect to an image formed from said CMYK data by an image forming device;

the black-character color judging step of judging whether or not said CMYK data generated by said CMYK data generating step represents a black-character color;

the colorimetric value correcting step of correcting said colorimetric value by performing a contrast correction appropriate for a black-character color to the colorimetric value converted by said colorimetric value converting step from the CMYK data judged to represent the black-character color by said black-character color judging step, and by performing a contrast correction appropriate for a non-black-character color to the colorimetric value converted by said colorimetric value converting step from the CMYK data judged to represent the non-black-character color by said black-character color judging step; and the color conversion profile setting step of setting said color conversion profile by using said colorimetric value corrected by said colorimetric value correcting step, wherein said color conversion profile has a characteristic of emphasizing a contrast of the output color data corresponding to the CMYK data representing the black-character color more than a contrast of the output color data corresponding to the CMYK data representing the non-black-character color.

14. A color converting device converting input CMYK data into output color data in a predetermined different format, the device comprising:

a black-character color judging unit judging whether or not the CMYK data represents a black-character color;

a color conversion profile representing a correspondence of the CMYK data with the output color data; and a color converting unit converting the CMYK data into the output color data by referring to said color conversion profile, wherein said color conversion profile has a characteristic of emphasizing a contrast of the output color data corresponding to the CMYK data judged by the black-character color judging unit as representing a black-character color more than a contrast of the output color data corresponding to the CMYK data judged by the black-character color judging unit as representing a non-black-character color, wherein the black-character color judging unit is configured to judge whether or not a given pixel of an image of the CMYK data represents a black-character color in response to whether $C \leq th$, $M \leq th$, $Y \leq th$, and $K>0$ is satisfied with respect to the given pixel, wherein th represents a predetermined threshold, and wherein said color conversion profile is created by a color conversion profile creating device including:

a CMYK data generation unit generating the CMYK data;

a colorimetric value converting unit converting said CMYK data generated by said CMYK data generation unit into a colorimetric value to be measured with respect to an image formed from said CMYK data by an image forming device;

a colorimetric value correcting unit correcting said colorimetric value by performing a contrast correction appropriate for a black-character color to the colorimetric value converted by said colorimetric value converting unit from the CMYK data judged to represent the black-character color by said black-character color judging unit, and by performing a contrast correction appropriate for a non-black-character color to the colorimetric value converted by said colorimetric value converting unit from the CMYK data judged to represent the non-black-character color by said black-character color judging unit; and a color conversion profile setting unit setting said color conversion profile by using said colorimetric value corrected by said colorimetric value correcting unit, wherein said color conversion profile is caused to have said characteristic.

15. The color converting device as claimed in claim 14, further comprising said color conversion profile creating device.

16. A color converting device converting input CMYK data into output color data in a predetermined different format, the device comprising:

a black-character color judging unit judging whether or not the CMYK data represents a black-character color;

a color conversion profile representing a correspondence of the CMYK data with the output color data; and a color converting unit converting the CMYK data into the output color data by referring to said color conversion profile, wherein said color conversion profile has a characteristic of emphasizing a contrast of the output color data corresponding to the CMYK data judged by the black-character color judging unit as representing a black-character color more than a contrast of the output color data corresponding to the CMYK data judged by the black-character color judging unit as representing a non-black-character color, wherein the black-character color judging unit is configured to judge whether or not a given pixel of an image of the CMYK data represents a black-character color in response to whether $C \leq th$, $M \leq th$, $Y \leq th$, and $K>0$ is satisfied with respect to the given pixel, wherein th represents a predetermined threshold, and wherein said color conversion profile is created by a color conversion profile creating method including:

the CMYK data generating step of generating the CMYK data;

the colorimetric value converting step of converting said CMYK data generated by said CMYK data generating step into a colorimetric value to be measured with respect to an image formed from said CMYK data by an image forming device;

the black-character color judging step of judging whether or not said CMYK data generated by said CMYK data generating step represents a black-character color;

the colorimetric value correcting step of correcting said colorimetric value by performing a contrast correction appropriate for a black-character color to the colorimetric value converted by said colorimetric value converting step from the CMYK data judged to represent the black-character color by said black-character color judging step, and by performing a contrast correction appropriate for a non-black-character color to the colorimetric value converted by said colorimetric value converting step from the CMYK data judged to represent the non-black-character color by said black-character color judging step; and the color conversion profile setting step of setting said color conversion profile by using said colorimetric value corrected by said colorimetric value correcting step, wherein said color conversion profile is caused to have said characteristic.

17. An image forming device forming an image by using CMYK data, the image forming device comprising:

a color converting device converting the CMYK data generated in the image forming device into output color data in a predetermined different format, the color converting device including:

a CMYK/colorimetric-value conversion unit converting the CMYK data into a colorimetric value to be measured with respect to an image formed from the CMYK data by an image forming device;

a black-character color judging unit judging whether or not the CMYK data represents a black-character color;

a colorimetric value correction unit correcting said colorimetric value by performing a contrast correction appropriate for a black-character color to the colorimetric value converted by said CMYK/colorimetric-value conversion unit from the CMYK data judged to represent the black-character color by said black-character color judging unit, and by performing a contrast correction appropriate for a non-black-character color to the colorimetric value converted by said CMYK/colorimetric-value conversion unit from the CMYK data judged to represent the non-black-character color by said black-character color judging unit; and a colorimetric-value/output-color-data conversion unit converting said colorimetric value corrected by said colorimetric value correction unit into the output color data, wherein a contrast of the output color data corresponding to the CMYK data judged to represent the black-character color is emphasized more than a contrast of the output color data corresponding to the CMYK data judged to represent the non-black-character color.

18. An image forming device forming an image by using CMYK data, the image forming device comprising:

a black-character color judging unit judging whether or not the CMYK data represents a black-character color;

a color converting device converting the CMYK data generated in the image forming device into output color data in a predetermined different format, the color converting device including:

a color conversion profile representing a correspondence of the CMYK data with the output color data; and a color converting unit converting the CMYK data into the output color data by referring to said color conversion profile, wherein said color conversion profile has a characteristic of emphasizing a contrast of the output color data corresponding to the CMYK data judged by the black-character color judging unit as representing a black-character color more than a contrast of the output color data corresponding to the CMYK data judged by the black-character color judging unit as representing a non-black-character color, wherein the black-character color judging unit is configured to judge whether or not a given pixel of an image of the CMYK data represents a black-character color in response to whether $C \leq th$, $M \leq th$, $Y \leq th$, and $K>0$ is satisfied with respect to the given pixel, wherein th represents a predetermined threshold, and wherein said color conversion profile is created by a color conversion profile creating device including:

a CMYK data generation unit generating the CMYK data;

a colorimetric value converting unit converting said CMYK data generated by said CMYK data generation unit into a colorimetric value to be measured with respect to an image formed from said CMYK data by an image forming device;

a colorimetric value correcting unit correcting said colorimetric value by performing a contrast correction appropriate for a black-character color to the colorimetric value converted by said colorimetric value converting unit from the CMYK data judged to represent the black-character color by said black-character color judging unit, and by performing a contrast correction appropriate for a non-black-character color to the colorimetric value converted by said colorimetric value converting unit from the CMYK data judged to represent the non-black-character color by said black-character color judging unit; and a color conversion profile setting unit setting said color conversion profile by using said colorimetric value corrected by said colorimetric value correcting unit, wherein said color conversion profile is caused to have said characteristic.

19. An image forming device forming an image by using CMYK data, the image forming device comprising:

a black-character color judging unit judging whether or not the CMYK data represents a black-character color;

a color converting device converting the CMYK data generated in the image forming device into output color data in a predetermined different format, the color converting device including:

a color conversion profile representing a correspondence of the CMYK data with the output color data; and a color converting unit converting the CMYK data into the output color data by referring to said color conversion profile, wherein said color conversion profile has a characteristic of emphasizing a contrast of the output color data corresponding to the CMYK data judged by the black-character color judging unit as representing a black-character color more than a contrast of the output color data corresponding to the CMYK data judged by the black-character color judging unit as representing a non-black-character color, wherein the black-character color judging unit is configured to judge whether or not a given pixel of an image of the CMYK data represents a black-character color in response to whether $C \leq th$, $M \leq th$, $Y \leq th$, and $K>0$ is satisfied with respect to the given pixel, wherein th represents a predetermined threshold, and wherein said color conversion profile is created by a color conversion profile creating method including:

the CMYK data generating step of generating the CMYK data;

the colorimetric value converting step of converting said CMYK data generated by said CMYK data generating step into a colorimetric value to be measured with respect to an image formed from said CMYK data by an image forming device;

the black-character color judging step of judging whether or not said CMYK data generated by said CMYK data generating step represents a black-character color;

the colorimetric value correcting step of correcting said colorimetric value by performing a contrast correction appropriate for a black-character color to the colorimetric value converted by said colorimetric value converting step from the CMYK data judged to represent the black-character color by said black-character color judging step, and by performing a contrast correction appropriate for a non-black-character color to the colorimetric value converted by said colorimetric value converting step from the CMYK data judged to represent the non-black-character color by said black-character color judging step; and the color conversion profile setting step of setting said color conversion profile by using said colorimetric value corrected by said colorimetric value correcting step, wherein said color conversion profile is caused to have said characteristic.

20. An image forming device forming an image by using CMYK data, the image forming device comprising:

a color conversion profile creating device creating a color conversion profile used for converting the CMYK data generated in the image forming device into output color data in a predetermined different format, the color conversion profile creating device including:

a CMYK data generation unit generating the CMYK data;

a colorimetric value converting unit converting said CMYK data generated by said CMYK data generation unit into a colorimetric value to be measured with respect to an image formed from said CMYK data by an image forming device;

a black-character color judging unit judging whether or not said CMYK data generated by said CMYK data generation unit represents a black-character color;

a colorimetric value correcting unit correcting said colorimetric value by performing a contrast correction appropriate for a black-character color to the colorimetric value converted by said colorimetric value converting unit from the CMYK data judged to represent the black-character color by said black-character color judging unit, and by performing a contrast correction appropriate for a non-black-character color to the colorimetric value converted by said colorimetric value converting unit from the CMYK data judged to represent the non-black-character color by said black-character color judging unit; and a color conversion profile setting unit setting said color conversion profile by using said colorimetric value corrected by said colorimetric value correcting unit, wherein said color conversion profile has a characteristic of emphasizing a contrast of the output color data corresponding to the CMYK data representing the black-character color more than a contrast of the output color data corresponding to the CMYK data representing the non-black-character color.

21. A computer readable recording medium storing program code for causing a computer to convert input CMYK data into output color data in a predetermined different format, the recording medium comprising:

CMYK/colorimetric-value converting program code means for converting the CMYK data into a colorimetric value to be measured with respect to an image formed from the CMYK data by an image forming device;

black-character color judging program code means for judging whether or not the CMYK data represents a black-character color;

colorimetric value correcting program code means for correcting said colorimetric value by performing a contrast correction appropriate for a black-character color to the colorimetric value converted by said CMYK/colorimetric-value converting program code means from the CMYK data judged to represent the black-character color by said black-character color judging program code means, and by performing a contrast correction appropriate for a non-black-character color to the colorimetric value converted by said CMYK/colorimetric-value converting program code means from the CMYK data judged to represent the non-black-character color by said black-character color judging program code means; and colorimetric-value/output-color-data converting program code means for converting said colorimetric value corrected by said colorimetric value correcting program code means into the output color data, wherein a contrast of the output color data corresponding to the CMYK data judged to represent the black-character color is emphasized mare than a contrast of the output color data corresponding to the CMYK data judged to represent the non-black-character color.

22. A color converting method for converting input CMYK data into output color data in a predetermined different format, the method comprising:

the CMYK/colorimetric-value converting step of converting the CMYK data into a colorimetric value to be measured with respect to an image formed from the CMYK data by an image forming device;

the black-character color judging step of judging whether or not the CMYK data represents a black-character color;

the colorimetric value correcting step of correcting said colorimetric value by performing a contrast correction appropriate for a black-character color to the colorimetric value converted by said CMYK/colorimetric-value converting step from the CMYK data judged to represent the black-character color by said black-character color judging step, and by performing a contrast correction appropriate for a non-black-character color to the colorimetric value converted by said CMYK/colorimetric-value converting step from the CMYK data judged to represent the non-black-character color by said black-character color judging step; and the colorimetric-value/output-color-data converting step of converting said colorimetric value corrected by said colorimetric value correcting step into the output color data, wherein a contrast of the output color data corresponding to the CMYK data judged to represent the black-character color is emphasized more than a contrast of the output color data corresponding to the CMYK data judged to represent the non-black-character color.

23. A color converting device for converting CMYK data into output color data in a predetermined different format by referring to a color conversion profile so as to convert the CMYK data into the output color data, the color converting device comprising:

a CMYK data generation unit generating the CMYK data;

a colorimetric value converting unit converting said CMYK data generated by said CMYK data generation unit into a colorimetric value to be measured with respect to an image formed from said CMYK data by an image forming device;

a black-character color judging unit judging whether or not said CMYK data generated by said CMYK data generation unit represents a black-character color;

a colorimetric value correcting unit correcting said colorimetric value by performing a contrast correction appropriate for a black-character color to the colorimetric value converted by said colorimetric value converting unit from the CMYK data judged to represent the black-character color by said black-character color judging unit, and by performing a contrast correction appropriate for a non-black-character color to the colorimetric value converted by said colorimetric value converting unit from the CMYK data judged to represent the non-black-character color by said black-character color judging unit; and a color conversion profile setting unit setting said color conversion profile by using said colorimetric value corrected by said colorimetric value correcting unit, wherein said color conversion profile has a characteristic of emphasizing a contrast of the output color data corresponding to the CMYK data representing the black-character color more than a contrast of the output color data corresponding to the CMYK data representing the non-black-character color.

24. A color converting method for converting CMYK data into output color data in a predetermined different format, the color converting method comprising the step of:

referring to a color conversion profile so as to convert the CMYK data into the output color data, the color conversion profile being created by a color conversion profile creating method including:

the CMYK data generating step of generating the CMYK data;

the colorimetric value converting step of converting said CMYK data generated by said CMYK data generating step into a colorimetric value to be measured with respect to an image formed from said CMYK data by an image forming device;

the black-character color judging step of judging whether or not said CMYK data generated by said CMYK data generating step represents a black-character color;

the colorimetric value correcting step of correcting said colorimetric value by performing a contrast correction appropriate for a black-character color to the colorimetric value converted by said colorimetric value converting step from the CMYK data judged to represent the black-character color by said black-character color judging step, and by performing a contrast correction appropriate for a non-black-character color to the colorimetric value converted by said colorimetric value converting step from the CMYK data judged to represent the non-black-character color by said black-character color judging step; and the color conversion profile setting step of setting said color conversion profile by using said colorimetric value corrected by said colorimetric value correcting step, wherein said color conversion profile has a characteristic of emphasizing a contrast of the output color data corresponding to the CMYK data representing the black-character color more than a contrast of the output color data corresponding to the CMYK data representing the non-black-character color.

25. A computer readable recording medium storing program code for causing a computer to create a color conversion profile used for converting CMYK data into output color data in a predetermined different format, the recording medium comprising:

CMYK data generating program code means for generating the CMYK data;

colorimetric value converting program code means for converting said CMYK data generated by said CMYK data generating program code means into a colorimetric value to be measured with respect to an image formed from said CMYK data by an image forming device;

black-character color judging program code means for judging whether or not said CMYK data generated by said CMYK data generating program code means represents a black-character color;

colorimetric value correcting program code means for correcting said colorimetric value by performing a contrast correction appropriate for a black-character color to the colorimetric value converted by said colorimetric value converting program code means from the CMYK data judged to represent the black-character color by said black-character color judging program code means, and by performing a contrast correction appropriate for a non-black-character color to the colorimetric value converted by said colorimetric value converting program code means from the CMYK data judged to represent the non-black-character color by said black-character color judging program code means; and color conversion profile setting program code means for setting said color conversion profile by using said colorimetric value corrected by said colorimetric value correcting program code means, wherein said color conversion profile has a characteristic of emphasizing a contrast of the output color data corresponding to the CMYK data representing the black-character color more than a contrast of the output color data corresponding to the CMYK data representing the non-black-character color.

* * * * *